(12) United States Patent
Farrah et al.

(10) Patent No.: US 6,882,892 B2
(45) Date of Patent: Apr. 19, 2005

(54) SYSTEM AND METHOD FOR SPECIFYING ELEMENTS IN A PACKAGING PROCESS

(75) Inventors: Timothy Francis Farrah, Victoria (AU); Peter John Filmer, Victoria (AU); Fiona Elizabet Hamilton, New South-Wales (AU); Mark Francis Nihill, Victoria (AU); James Walker Selway, Victoria (AU); Ernest Yuet Ning Shaw, Victoria (AU); Frederick Walter Van Den Hout, Victoria (AU)

(73) Assignee: Amcor Limited, Abbotsfor (AU)

( * ) Notice: Subject to any disclaimer, the term of this patent is extended or adjusted under 35 U.S.C. 154(b) by 0 days.

(21) Appl. No.: 10/181,763

(22) PCT Filed: Jan. 19, 2001

(86) PCT No.: PCT/AU01/00056

§ 371 (c)(1),
(2), (4) Date: Aug. 20, 2002

(87) PCT Pub. No.: WO01/54004

PCT Pub. Date: Jul. 26, 2001

(65) Prior Publication Data

US 2003/0083762 A1 May 1, 2003

Related U.S. Application Data

(60) Provisional application No. 60/179,279, filed on Jan. 31, 2000.

(30) Foreign Application Priority Data

Jan. 21, 2000 (AU) .............................................. PQ 5212

(51) Int. Cl.[7] .......................... G06F 19/00; G06F 17/50
(52) U.S. Cl. ........................ 700/97; 700/103; 700/117; 703/1; 345/964
(58) Field of Search ........................ 700/28–30, 32–34, 700/36, 97, 103–107, 117; 703/1; 705/7; 706/919; 707/3; 345/964

(56) References Cited

U.S. PATENT DOCUMENTS

| 4,912,657 | A |   | 3/1990  | Saxton et al. ............... 345/853 |
| 5,301,118 | A |   | 4/1994  | Heck et al. .................. 700/119 |
| 5,552,995 | A | * | 9/1996  | Sebastian ...................... 700/97 |
| 5,655,087 | A |   | 8/1997  | Hino et al. ................... 705/29 |
| 5,765,137 | A |   | 6/1998  | Lee ................................. 705/7 |
| 5,815,394 | A | * | 9/1998  | Adeli et al. ................... 700/97 |
| 5,844,554 | A |   | 12/1998 | Geller et al. ................. 345/744 |
| 5,912,678 | A | * | 6/1999  | Saxena et al. .............. 700/103 |
| 6,009,406 | A |   | 12/1999 | Nick ............................ 705/10 |
| 6,041,263 | A | * | 3/2000  | Boston et al. ................ 700/32 |
| 6,125,374 | A | * | 9/2000  | Terry et al. .................. 715/502 |
| 6,249,714 | B1 | * | 6/2001 | Hocaoglu et al. ............. 700/97 |
| 6,295,513 | B1 | * | 9/2001 | Thackston ..................... 703/1 |
| 6,327,551 | B1 | * | 12/2001| Peterson et al. ............... 703/1 |

FOREIGN PATENT DOCUMENTS

EP        0 473 522        3/1992

OTHER PUBLICATIONS

DeNola Boxboard Containers International Feb. 2000, pp. 29–30 "Package Design & the Internet".
Hardwick et al IEEE Internet Computing Jan.–Feb. 1997 "Data Protocols for the Industrial Virtual Enterprise".

* cited by examiner

Primary Examiner—Paul Rodriguez
(74) Attorney, Agent, or Firm—Nixon & Vanderhye, PC

(57) ABSTRACT

A software system for specifying design of at least two links in a packaging chain includes first and second software modules for specifying designs of first and second links in the packaging chain. The software modules have respective parameters each of which should not normally be breached. A conversion system interconnects the first software module and the second software module to enable data representing the link in the packaging chain specified by either the first software module or the second software module to be recognized in the other of the software modules. A feedback system provides feedback when there is a breach.

55 Claims, 20 Drawing Sheets

FIGURE 8

| | | All the Modules (Product, Primary Pack, etc etc) | | | | | | | | | | |
|---|---|---|---|---|---|---|---|---|---|---|---|---|
| | | Module A | | | Module B | | | Module C | | | Module D | | |
| | | Dep Vars | Op | Indep Vars | Dep Vars | Op | Indep Vars | Dep Vars | Op | Indep Vars | Dep Vars | Op | Indep Vars |
| All the specifications: | x | Ax1 | = | 2300 | Bx1 | > | 2500 | Cx1 | > | Dx1 | Dx1 | = | 3000 |
| Style | | Ax2 | > | Cz2 | Bx2 | = | Dz1 | Cx2 | > | 1000 | Dx2 | = | 400 |
| | | Ax3 | > | Dx3+Bz4 | Bx3 | <= | Bz4 | Cx3 | > | 1200 | Dx3 | = | 1-Ay3 |
| Size | y | Ay1 | < | 1000 | By1 | = | Az4 | | | | Dy1 | * | 0 |
| Material | | Ay2 | < | Cz4/Cz3 | By2 | < | Cz3 | | | | Dy2 | " | 0 |
| Graphics | | Ay3 | < | Dx1 | | | | | | | | | |
| Efficiency | z | Az1 | < | Cx2 | Bz1 | > | 1030 | Cz1 | = | Dz1 | Dz1 | < | Ay1 |
| Cost | | Az2 | > | 1000 | Bz2 | <= | 4500 | Cz2 | = | Dz2 | Dz2 | < | 3000 |
| etc | | Az3 | >= | 400 | Bz3 | = | 21 | Cz3 | = | Dz3 | Dz3 | <= | 1200 |
| | | Az4 | < | 100-Dx1 | Bz4 | > | Cz4 | Cz4 | = | Dz4 | Dz4 | = | 45-Cx1 |

Manufacturing and Process linkages

| | Manufacturing_A | | | Process_AB | | | Process_BC | | | Process_CD | | |
|---|---|---|---|---|---|---|---|---|---|---|---|---|
| | Dep Vars | Op | Indep Vars | Dep Vars | Op | Indep Vars | Dep Vars | Op | Indep Vars | Dep Vars | Op | Indep Vars |
| X | | | | Bx1 | = | 10 * | Cx1 | > | Bx1*5 | Dx1 | = | Cx1 |
| X | | | | Bx2 | = | Ax1 | Cx2 | > | Bx1+Bx2 | Dx2 | = | Cx2-Cx1 |
| X | | | | | | Ax1+Ax2 | Cx3 | > | Bx2+Bx3 | Dx3 | = | 100-Cx3 |
| Y | Ay3 | = | Ax1/Ay1 | | | | | | | | | |
| Z | | | | Bz1 | > | 100-Az3 | | | | | | |

All the specifications as per the Modules above

FIGURE 9

|  | Product | Wrapper | Carton | Shipper | Pallet | Retail |
|---|---|---|---|---|---|---|
| Style |  | Yes | Yes | Yes |  |  |
| Size | Yes → | Yes → | Yes → | Yes → | Yes |  |
| Material |  |  |  |  |  |  |
| Graphics |  | Yes |  |  |  |  |
| Efficiency |  |  | Yes* | Yes* | Yes* |  |
| Cost |  |  |  |  |  |  |

Columns: 31a, 31b, 31c, 31d, 31e, 31f
Rows: 33a, 33b, 33c, 33d, 33e, 33f

\* Optimise on these specifications
→ Process linkages

FIGURE 10

| Var:Constraint | Fuzzy constraint? | Iterating variable? |
|---|---|---|
| $L_p$ >= 110 | yes | yes |
| $L_p$ <= 150 | yes | yes |
| $W_p$ >= 25 | yes | yes |
| $W_p$ <= 30 | yes | yes |
| $D_p$ = 7 | yes | no |
| $L_p \times W_p \times D_p$ = 25000 | no | no |

FIGURE 11

| Var:Constraint | Fuzzy? | Iterating Var? |
|---|---|---|
| $L_w = L_p + 20$ | No | no |
| $W_w = 2 \times (W_p + D_p) + 25$ | No | no |

FIGURE 12

| Barcode | Var:Constraint | Fuzzy? | Iterating Var? |
|---|---|---|---|
| Orientation 1 | $L_p$ >=80+5+20+5+30 - i.e.>=140 | yes | yes |
| | $W_p$ >=MAX(15,20,10) - i.e.>=20 | yes | yes |
| Orientation 2 | $L_p$ >=80+5+20+5+10 - i.e.>=170 | yes | yes |
| | $W_p$ >=MAX(15,20,30) - i.e.>=30 | yes | yes |

FIGURE 13

| Product Orientation | Var:Constraint | Fuzzy? | Iterating Var? |
|---|---|---|---|
| | $P_{nw} = 1$ | no | no |
| | $P_{nw} \times P_{nd} \times P_{nh} <= 30$ | yes | yes |
| | $P_{nw} \times P_{nd} \times P_{nh} >= 20$ | yes | yes |
| | $D_c <= 250$ | no | yes |
| | $H_c <= 200$ | yes | yes |
| Orientation 1 | $W_c = P_{nw} \times L_p + 2$ | yes | yes |
| | $D_c = P_{nd} \times W_p + 2$ | yes | yes |
| | $H_c = P_{nh} \times D_p + 2$ | yes | yes |
| Orientation 2 | $W_c = P_{nw} \times L_p + 2$ | yes | yes |
| | $D_c = P_{nd} \times D_p + 2$ | yes | yes |
| | $H_c = P_{nh} \times W_p + 2$ | yes | yes |

FIGURE 14

| Product Orientation | Var:Constraint | Fuzzy? | Iterating Var? |
|---|---|---|---|
| | $C_{nl} \times C_{nw} \times C_{nd} = 24$ | no | no |
| | $H_s > L_s / 2$ | yes | yes |
| | $W_s > \text{Max}(L_s, W_s)$ | yes | yes |
| Orientation 1 | $L_s = C_{nl} \times H_c + 5$ | yes | yes |
| | $W_s = C_{nw} \times W_c + 5$ | yes | yes |
| | $D_s = C_{nd} \times D_c + 5$ | yes | yes |
| Orientation 2 | $L_s = C_{nl} \times H_c + 5$ | yes | yes |
| | $W_s = C_{nw} \times D_c + 5$ | yes | yes |
| | $D_s = C_{nd} \times W_c + 5$ | yes | yes |
| Orientation 3 | $L_s = C_{nl} \times D_c + 5$ | yes | yes |
| | $W_s = C_{nw} \times W_c + 5$ | yes | yes |
| | $D_s = C_{nd} \times H_c + 5$ | yes | yes |
| Orientation 4 | $L_s = C_{nl} \times W_c + 5$ | yes | yes |
| | $W_s = C_{uw} \times H_c + 5$ | yes | yes |
| | $D_s = C_{nd} \times D_c + 5$ | yes | yes |
| Orientation 5 | $L_s = C_{nl} \times D_c + 5$ | yes | yes |
| | $W_s = C_{nw} \times H_c + 5$ | yes | yes |
| | $D_s = C_{nd} \times W_c + 5$ | yes | yes |
| Orientation 6 | $L_s = C_{nl} \times W_c + 5$ | yes | yes |
| | $W_s = C_{nw} \times D_c + 5$ | yes | yes |
| | $D_s = C_{nd} \times H_c + 5$ | yes | yes |

FIGURE 15

| $L_D$ (mm) | 110 | 115 | 120 | 125 | 130 | 135 | 140 | 145 | 150 |
|---|---|---|---|---|---|---|---|---|---|
| $W_D$ (mm) | ~~32.5~~ | ~~31.1~~ | 29.8 | 28.6 | 27.5 | 26.5 | 25.5 | ~~24.6~~ | ~~23.8~~ |
| $D_D$ (mm) | 7 | 7 | 7 | 7 | 7 | 7 | 7 | 7 | 7 |

FIGURE 16

SYSTEM AND METHOD FOR SPECIFYING ELEMENTS IN A PACKAGING PROCESS

This application is the US national phase of international application PCT/AU01/00056 filed 19 Jan. 2001, which designated the US.

This application claims the benefit of Provisional Application No. 60/179,279, filed Jan. 31, 2000.

FIELD OF THE INVENTION

The present invention relates to a software system for specifying design of a product or process. The invention finds particular although not exclusive application in the packaging industry.

BACKGROUND OF THE INVENTION

A number of stages are involved in the marketing, design, manufacture and packaging of a product and its delivery to a point of sale and ultimately to a consumer. For example, a product such as sultanas may be stored in a plastic bag within a small carton or primary pack, a number of these cartons may be stored together in a larger carton with the larger cartons being placed inside a box. A number of boxes are then stored on a single pallet for transportation of the products from one location to another. Ultimately the boxes containing the cartons are delivered to a point of sale, such as a supermarket, or to place of end consumption.

With the number of stages involved in the packaging and transportation of a product it is clear that a change at one stage of the packaging chain—for example in the primary pack in which the sultanas are boxed—can cause a number of flow on changes to other stages in the chain. For example, if the company selling the sultanas decides to include twenty per cent more sultanas in each carton in an effort to boost sales of sultanas, this will A require some adjustment of the filling machinery in order to increase the capacity of each bag. As a result, the cartons in which the bags will be placed need to be redesigned, not only so they are of the optimum size but also to incorporate the company's graphical images such as trade marks and perhaps a reference to the new size. If it is necessary to pack, for example, twelve cartons of sultanas in each larger carton, the cartons may need to be re-sized. If the boxes are the same size, the arrangement of cartons inside individual boxes may need to be changed. The result of this may be that it is not possible to pack the cartons as efficiently in the existing boxes. Therefore, while there may be an increase in the amount of sultanas carried in individual primary packs, the efficiency in terms of weight of sultanas per box may be reduced. An alternative, would be to re-size the box to seek more efficient packing in terms of weight of sultanas per box. However, the change of size in the box may mean that graphics on the box need to be reworked in order to fit within certain requirements for the location of graphics on the boxes—for example the location of trade marks or other markings relative to industry standard markings such as a bar code on a particular portion of a box or product contents labels—all of which may be positioned on the packaging in industry standardized positions. Such fixed requirements may mean that the graphics chosen by the company for the box are no longer able to fit on the box thus requiring redesign. Further, re-sizing the box may mean that less boxes can be stacked on an individual pallet.

In addition to the above, a redesign of packaging can sometimes cause problems at the point of sale of the product. For example, products designed for sale in supermarkets are usually designed to maximize shelf utilisation as the producer of the product generally must pay for the shelf space, particularly eye level shelf space. Thus, a redesign of packaging may affect the arrangement of the product on the shelf and can in some instances result in less exposure of the product to the purchaser for a given shelf space than other packaging designs.

A change in packaging size may mean that the material from which the packaging is made will need to be changed or the thickness or strength may need to be changed to accommodate for the extra bulk and/or weight.

Thus, there may be one or more design parameters involved which ideally should not be changed, or at least without alerting the consequences of the change to persons responsible for the packaging design.

It will be seen that changes at different stages of the packaging chain can have a very large number of flow on or flow back effects. The packaging industry's approach to dealing with this matter has been essentially empirical—i.e. to provide a packaging customer with a limited range of options which are all known to provide reasonably workable solutions. Any changes to packaging are then simply carried over from one step to another in a largely independent linear manner. Further, tools have been developed for local optimization of particular processes such as the arrangement of cartons within a box.

One problem with such known arrangements is the difficulty for the customer to know what impact changes made at one stage of the packaging chain will have on other stages. Taking the example given above, marketing research may have indicated that consumers would be more likely to purchase the company's product if that product was supplied in twenty per cent larger quantity. This leads to the company redesigning its packaging to accommodate twenty per cent more sultanas. This requires the company to source bags of a different size and redesign the primary pack cartons in which the sultanas are sold to consumers. The company decides to re-size the packaging by increasing the height of individual cartons by twenty per cent. The changes to the product prove successful and sales increase but unfortunately, the increase in sales does not translate to a substantial increase in profit because the changes to the packaging have introduced inefficiencies into the rest of the packaging chain.

Current attempts to deal with this situation revolve around local optimization of solutions—for example say, identifying the best solution for packing a particular box. However, there is no practical way of determining whether the current solution or method of packaging is a particularly efficient one, in relation to the entire packaging chain, or whether, for example, the capacity of the carton of sultanas could have been increased by twenty per cent by combined adjustments of its depth and width without the consequential reduction in cost efficiency. That is to say, existing systems cannot measure whether it is possible to change dimensions without trading off cost efficiencies. Further, it should be noted that a number of changes can be made at different stages of the packaging chain, for example to decide to replace eight cartons of sultanas in a carton instead of twelve because of a change in supermarket stocking requirements. Obviously, whichever aspect of the packaging chain changes there is a possibility that there will be a flow on effect. Such flow on effects may impact adversely on overall efficiency and therefore it would be advantageous to provide a technique for identifying the ramifications of changes at various stages in the packaging process which have flow on effects.

Furthermore, it would be advantageous to provide a tool for analysing the impact of proposed changes before they are implemented or at least to provide a guide to the ramifications.

A further problem with existing packaging systems is that it is difficult to compare different packaging styles. For example, it may be that the most efficient shape for a wine cask (in Australia wine sold in boxes, with an internal bag containing the wine, are known colloquially as casks, they are also commonly referred to as bag in box styles) is a rectangular prism. Such rectangular prism shaped casks may be more susceptible to damage than an octagonal prism shaped cask. It would be advantageous to provide a system which allows comparison between packaging styles which takes into account a number of their characteristics such as strength, ease of opening, packing efficiency.

OBJECT AND STATEMENT OF THE INVENTION

Therefore it is an object of the present invention to attempt to overcome one or more of the above problems. Other objects will become apparent from the following description.

Therefore in accordance with one aspect of the present invention there may be a software system for specifying design of a product or process, said system having:

a first software module for specifying design of the product or process according to a first set of design criteria, a second software module independent of the function of the first software module for specifying design of the product or process according to a second set of design criteria, said first set of design criteria and said second set of design criteria being different to one another, said first software module having a predetermined parameter having a limit which should not normally be breached, conversion means interconnecting the first software module and the second software module to enable data representing the product or process specified by either the first software module or the second software module to be recognized in the other of the software modules, feedback means to provide feedback when specification of said product or process by said second software module will breach the limit of said predetermined parameter.

Preferably, said feedback is provided to a controller which acts to resolve breaching.

Preferably, said feedback is provided to said second module and said second module restricts specification of the product by the second module to avoid further breaching.

Preferably, said controller will allow specification of the product or process which may have caused breaching to continue by permitting adjustment of the parameter past the limit with a user's knowledge.

Preferably, the first software module and the second software module each have a predetermined parameter different to each other, each having a limit which should not normally be breached and said feedback means provides feedback if there is or is likely to be a breach of either limit.

Preferably, each software module has a plurality of predetermined parameters, each predetermined parameter having a limit which should not normally be breached and said feedback means provides feedback if there is or is likely to be a breach of any one of said limits.

Preferably, said system permits a user to adjust a limit.

Preferably, said system permits a user to set the limit of a predetermined parameter.

Preferably, there are a plurality of modules for specifying design of said product or process and wherein each module has a predetermined parameter having a limit which should not normally be breached and wherein said feedback means provides feedback if specification of said product by any of said modules will breach the limit of any of said predetermined parameters.

Preferably, the product or process is packaging and/or packaging related systems.

In another aspect, the invention provides a software system for specifying design of a product or process having at least two interrelated aspects, said software system having:

a first software module for specifying design of a first aspect of the product or process by means of a first set of parameters, wherein one parameter of said first set of parameters is a constrained parameter which may only take predetermined allowable values; and a second software module for specifying design of a second aspect of the product or process by means of a second set of parameters, said first and second modules being connected such that specification of said second aspect of the product or process by means of said second set of parameters is automatically constrained to values of said second set of parameters which relate to allowable values of said constrained parameter of said first set of parameters.

Preferably, one of the parameters of said second set of parameters is a constrained parameter which may only take predetermined allowable values, and specification of said first aspect of the product or process by means of said first set of parameters is automatically constrained to values of said first set of parameters which relate to allowable values of said constrained parameter of said second set of parameters.

Preferably, a plurality of the parameters of said first set of parameters are constrained parameters which may only take predetermined values, and specification of said second aspect is automatically constrained to values of said second set of parameters which relate to allowable values of said constrained parameters of said first set of parameters.

Preferably, a plurality of the parameters of said second set of parameters are constrained, and specification of said first aspect is automatically constrained to values of said first set of parameters which relate to allowable values of said constrained parameters of said second set of parameters.

Preferably, specification of said second aspect of the product or process is automatically constrained by means of feedback from the first module.

Preferably, specification of said first aspect of the product or process is automatically constrained by feedback from said second module.

In a further aspect, the invention provides a system for selecting a packaging style including:

a database for storing a plurality of packaging styles, each packaging style having a set of attributes;

style specification means for allowing a user to specify desired attributes of a packaging style;

comparison means for comparing said desired attributes with said sets of attributes of said packaging styles stored in said database in order to determine a packaging style having a set of attributes related to said desired attributes; and display means for displaying said determined packaging style to said user.

Preferably, said comparison means determines a plurality of packaging styles having a set of attributes related to said desired attributes, and said display means displays said plurality of determined packaging styles, whereafter said user or system can select a packaging style from said plurality of packaging styles.

Preferably, said comparison means produces a measure of how closely related the set of attributes a packaging style is to said desired attributes and said display means displays said measure to help said user to select a packaging style.

Preferably, said style specification means allows said user to specify the desirability of individual ones of said desired attributes and said comparison means determines a packaging style on the basis of the desirability of individual ones of said desired attributes.

Preferably, said style specification means allows the user to specify the desirability of individual ones of said desired attributes by assigning individual desired attributes a weighting and said system uses said weighting to determine a packaging style.

Preferably, said style specification means allows said user to specify attributes of a known packaging style as said desired attributes.

BRIEF DESCRIPTION OF THE DRAWINGS

A preferred embodiment of the invention will now be described with reference to the accompanying drawings in which:

FIG. 8 is a table showing how variables may interrelate;

FIG. 9 is a further table showing how variables may interrelate;

FIG. 10 is a table showing how a user would specify a problem according to the preferred embodiment;

FIG. 11 is a table summarising constraints on the specification of a product;

FIG. 12 is a table summarising constraints on the specification of a wrapper;

FIG. 13 is a table summarising constraints on the specification of a product imposed by graphic requirements;

FIG. 14 is a table summarising constraints on the specification of a carton imposed by the cartons size;

FIG. 15 is a table summarising constraints on a box;

FIG. 16 is a table summarising possible product dimensions;

DESCRIPTION OF THE PREFERRED EMBODIMENT

Figure 1:
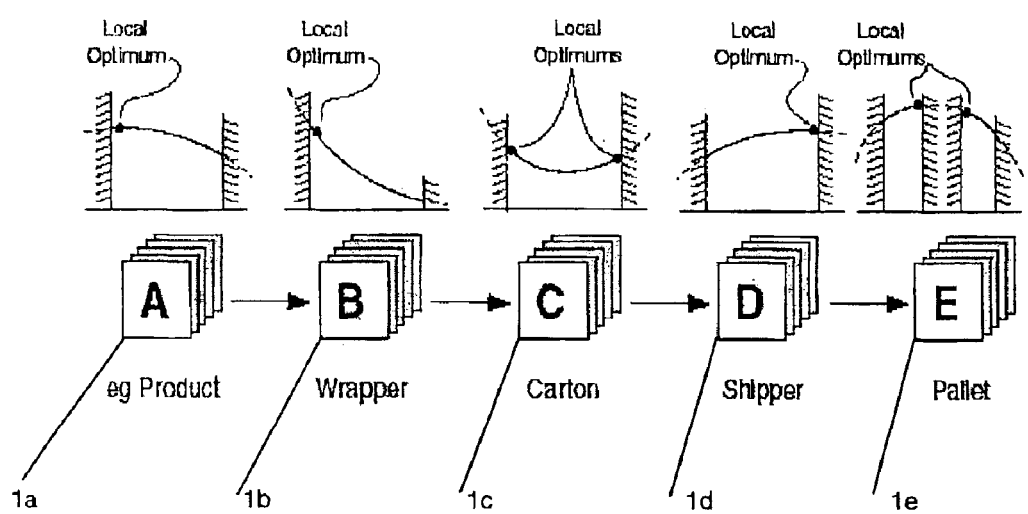
FIG. 1 is a schematic diagram showing the prior art method of specifying a packaging chain.

FIG. 1 illustrates how the packaging industry typically addresses packaging design problems in order to specify all of the elements in a packaging chain. It is a sequential process without direct feedback to modify variables set earlier in the chain. Individual software modules 1 attempt to optimize the specification of the products locally—i.e. module 1e attempts to optimize the arrangement of boxes on a pallet. The size of the boxes will already have been determined and there is no opportunity for the pallet module 1e to determine whether a box having a different size would provide a better solution to the arrangement of boxes on the pallet.

Further, various stages of, for example, the product development stage represented by module 1a may not involve any optimization at all. For example, the size of the product may be dictated solely by the characteristics of the machinery available in the manufacturing plant. Optimization at various stages may be for different goals. For example, at the carton module stage 1c, optimization may be merely to minimize the amount of cardboard used in constructing the cartons while still meeting certain strength requirements.

The preferred embodiment of the present invention aims to provide a more integrated system in which the overall packaging chain can be optimized while ensuring constraint satisfaction, and that optimization of part of the chain does not conflict with optimization of another or with user requirements and fixed operating parameters. For example, in a simple example the system may indicate that making cartons of a certain size will optimize the box and pallet stages of the packaging process. However, changing the size of the carton may conflict with the size of the product which may be fixed because of constraints in the production of the product itself.

Figure 2:
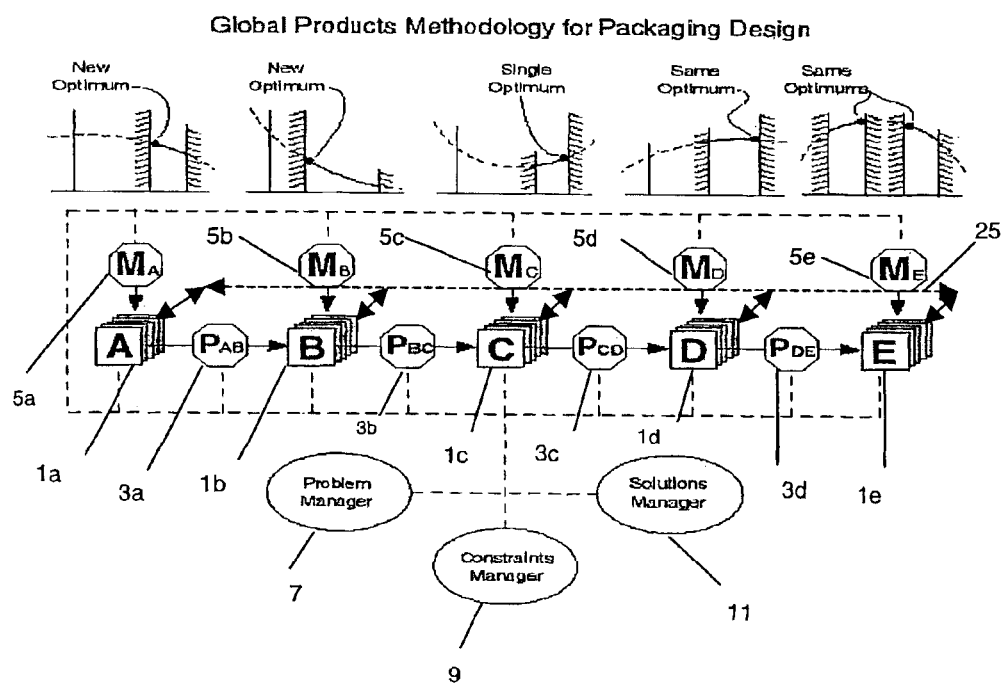
FIG. 2 is a schematic diagram showing the specification of a packaging chain according to a preferred embodiment of the invention.
Figure 21:
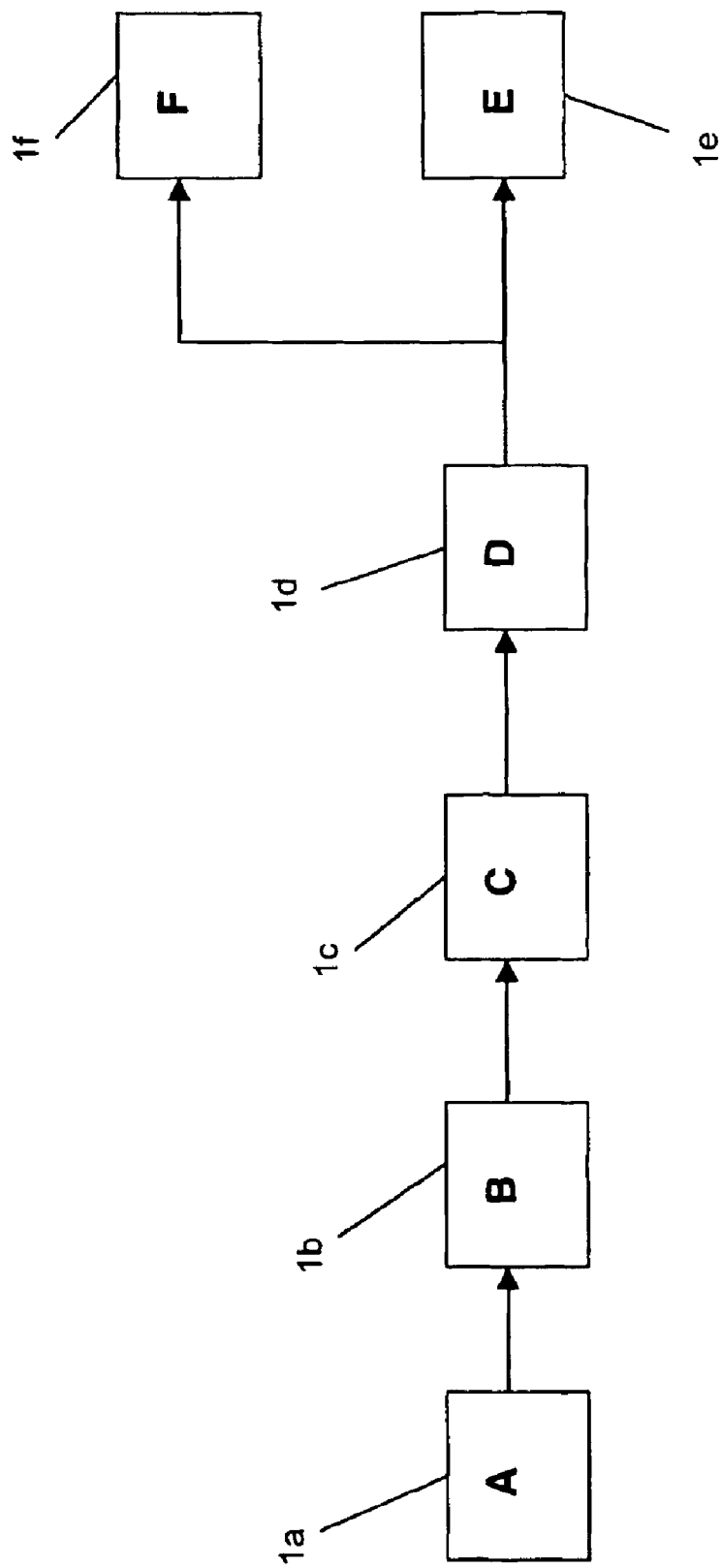
FIG. 21 is a simplified variation of FIG. 2 which illustrates breaching.

Referring to FIG. 2, there is shown schematically a preferred software system for specifying the various stages in a packaging process. The determination, setting and vetting of parameters associated with each module (or packaging element) may be carried out by a number of individuals associated with a range of companies/locations involved in the design/specification process. The configuration, control and management of this process may be carried out using a workflow paradigm which specifies how the process is carried out, allocates tasks and responsibilities and enables the process to be maintained. As in FIG. 1, individual software modules 1a, 1b, 1c, 1d and 1e are used to specify various packaging design stages in FIG. 2. FIG. 2 shows packaging software modules 1a, 1b, 1c, 1d and 1e, with interconnecting packaging systems software modules 3a, 3b, 3c and 3d, essentially connected in a linear manner (a single branch connection into and out of a module, ie. from node 1a to 3a to 1b to 3b etc). There are a large number of possible constructs including systems that will contain multiple branching, where more than one branch connection into and out of a module may exist. For example referring to FIG. 21, a multiple branch point will exist when a box is required to be capable of being efficiently stacked onto a pallet (module 1e) and also into a shipping container (module 1f) (required at different stages of the distribution chain). The latter results in two branches emanating from the box (module 1d), one to a pallet (module 1e) the other to a shipping container (module 1f) (which may go on to connect to another pallet etc). Another example would be when a carton is required to be efficiently arranged into a box and into a retail space.

Each of the modules 1a to 1e are for specifying design of the product according to respective sets of criteria and relationships where each set, although different to each other, may have a relationship which may be user defined. Items 3a, 3b, 3c, and 3d represent production processes which are located within the packaging users plant and the solid lines indicate the actual product flow. Items 5a, 5b, 5c, 5d and 5e represent the manufacturing processes for creating the packaging product. With the exception of manufacturing process 5a, which designates the manufacture of the actual product all other manufacturing processes are located in the packaging manufacturers plant.

The dotted lines between the various items indicate the two-way communication channels used by a controller which consists of a problem manager 7, a constraints manager 9 and a solution manager 11. That is, all of the modules may be in two-way communication with the controller. The modules 1 may also communicate with each other if necessary. The controller may control which modules 1 can communicate directly with one another. Further, submodules of a particular module 1 may only be in communication with the module 1 of which it is a sub-module. Alternatively, sub-modules may be able to communicate with the controller. The controller coordinates multiple packaging design problems into a single unified task in order to optimize the entire process.

In an alternative embodiment, the modules may be in direct communication and the control functionality may be embodied in the individual modules.

Each software module 1 will have a number of constraints. These constraints may be imposed by the design or manufacturing processes associated with the particular software module 1 or may be preset by a user. An example of a user set and defined constraint would be that a packet of sultanas must contain at least 250 gm of sultanas. Each constraint can therefore be considered as being a predetermined parameter having a limit which should not be breached. Thus, specification of the product or process will be constrained so that a parameter has an allowable value with a range bound by the limit.

The system aims to optimize the solution to the overall packaging specification by iterating through all the possible solutions which fall within the constraints of particular software modules 1. To begin this process, the constraints manager 9 of the controller of the software system attempts to reduce the number of iterations which are required by modelling solution spaces of individual modules. Such models are usually multi-dimensional and they attempt to establish a solution space which is bound by constraints within which feasible solutions can be generated.

Figure 3A:
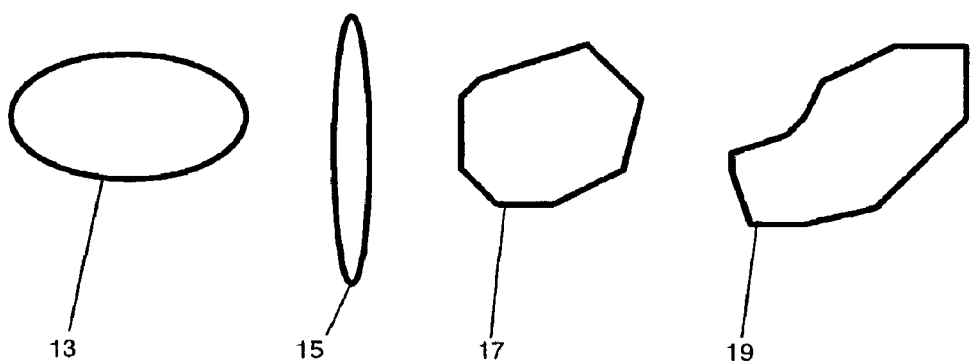
FIG. 3A is an example of four constraint boundaries for individual software modules.
Figure 3B:
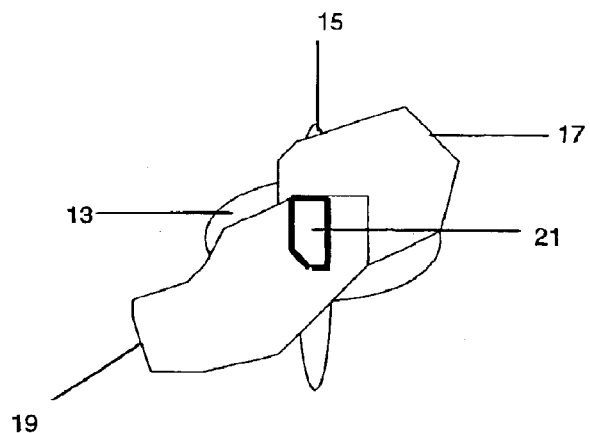
FIG. 3B shows the combination and intersection of the individual constraint boundaries shown in FIG. 3A.

A two dimensional example of a solution space is shown in FIGS. 3a and 3b. FIG. 3a shows four two-dimentional solution spaces. In FIG. 3b the first, second, third and fourth solution spaces 13, 15, 17 and 19 have been projected to produce a combined solution space 21. All iterations which require the interactions of variable values outside of the combined solution space 21 can be disregarded. When making this assessment, a controller of the software modules is faced with the difficulty in that not all constraints will be mappable from one module to the next. Therefore, the preferred system is provided with feedback means so that any individual module 1 can advise the controller that a particular iteration with a changed parameter run through one of the other modules 1 would cause a breach of one of the fixed constraints. The feedback means advises the controller that this is the case and the controller can then act in a number of ways to resolve the conflict—thus, the specification of the product or process by one module can be automatically constrained so that it relates to allowable values of a parameter in another module. This is discussed in further detail below.

Each individual module 1a, 1b, 1c, 1d and 1e has a number of variables and parameters defining each element of its specification. The specifications of the individual modules 1a, 1b, 1c, 1d and 1e are combined to produce the overall specification of the entire packaging process to enable all of the items in the packaging chain to be made to the correct dimensions, . . . materials, performance levels etc. These variables and parameters might be lengths, depths, costs etc or even objects like graphics pictures. Variables could also be designated as contributing towards an objective function—objective functions being some measurement of the packaging process being efficient or satisfactory etc. These variables would be pushed towards their optimum with respect to a maximum (or minimum) of the objective function. The selection and prioritising of key variables may be used to restrict or bias the subspace of solutions within which an optimum is determined. This allows the user to guide the solution in alternate directions. There will be strong interrelationships between the variables of different modules 1 and different specification parameters. In the example below, they have been designated as algorithms (or equations). These interrelationships are either product or process related and have been separated accordingly both in FIG. 2 and the example below. Product modules encompass the accumulated learning, expertise and costs from the various product suppliers. Process modules are mostly plant related and encompass the operating the production related constraints, costs and relationships that vary from plant to plant. Many of the relationships (algorithms and equations) are fixed and not available to the user of the software system.

Many of the relationships have default values built in that can be altered by the user and saved in a configuration file if required. There may be the option for users to generate their own algorithms and relationships and objective functions. The process linkages 3a, 3b, 3c and 3d can be built in this way. For example, packing lines and their costs may need to be modelled in any number of complicated ways. Variables will be constrained within bounds, which may be relaxed in the search for other solutions. The number of modules 1, linkages and specifications required, depends on the packaging design problem. Third parties may be asked for input by the system in order to fully specify the packaging eg. Graphic specification may come from a design studio, glass specification from a glass manufacturer etc.

FIGS. 8 and 9 show examples of how variables may interrelate. The columns of FIG. 8 relate to individual modules 1 whereas the rows relate to some aspect of the specification of that module 1. These aspects of the specification of each module can be identified by a number of individual variables. Some variables may be defined. For example, the variable Ax1 is defined as being equal to 2300. Other variables have interrelationships. For example, the variable Ax3 must be greater than the sum of Dx3 and Bz4. As a result of these interrelationships, module A needs information from modules B, C and D before it can provide answers. Similarly, module B needs information from modules A, B, C and D before it can provide answers. Module C requires information from module D, and module D requires information from modules A and C. This interdependency means that there is a substantial opportunity for conflicts because there is a possibility that the limit of a variable may be breached by possible solutions for another variable.

Variables may be of several types, for example:
pictures, graphics and barcodes,
text,
numeric,
  standard,
  an objective function (e.g. cost),
  an iterating variable which will have its step size automatically calculated,
abstract data structures,
in the case of graphic variables a third party may be called on for input eg. an external design studio that will provide graphics to enable complete product graphics specification to be achieved.

Constraints are of two types:
constraints that cannot be broken. This would be the default constraint and would include all those defined by equality equations,
"fuzzy" constraints that may be relaxed. The dependent variable associated with that constraint may be permitted a tolerance. These constraints could be explicitly nominated or automatically relaxed by the constraints manager 9 (see FIG. 2) in response to the feedback means advising that a constraint has been breached or is likely to be breached.

Other parameters, in conjunction with the above set of variables, will satisfy the requirements of the system equations. The following types are considered:
model constants built into an algorithm/relationship, which cannot be changed by the user,
user defined or profile values, which remain constant during the optimization process,
object attributes, which assist in the broader description/definition of a packaging or process object but which are not utilised in the optimization process (eg color).

A variety of "expert system" techniques are used for guidance and relative ranking of subjective criteria nominated by users.

The problem manager 7 (see FIG. 2) performs a number of functions and is the manager most likely to interact directly with the user.

The problem manager 7:
guides and assists the user in the construction of the problem—i.e. what is the packaging solution being sought and what things are acceptable,
ensures that the components/modules of the problem being developed are consistent within the classes of problem that can be solved,
ensures that the data set required is sufficiently complete to allow the evaluation of possible solutions whether it is generated from a user supplied database, a customer profile or through default means,
tests and flags modelling/data conflicts and offers guidance for resolution,
decides which and how many modules 1 are required,
decides which specifications are required to be generated by each module 1a, 1b, 1c, 1d and 1e,
decides how the modules 1 are to be sequentially linked when evaluating a problem,
determines whether the process interfaces between linked modules are available and whether they are set up correctly,
considers the objectives to be attained by each module 1,
determines whether any special constraints, configurations or overrides for this problem. For example, various aspects of the specification may be performed by different users. One user may have greater priority than another user and therefore will be able to override a specification made by that user. In the reverse situation a user may not be able to adjust particular variables—i.e. a graphics studio may not be able to vary the boundary with which their art work needs to be located,
load up the customer profile, user defined or default data,
formally checks and acknowledges key variables and constraints,
calls the constraints manager 9 for an initial assessment of the problem before asking the solutions manager 11 to start iterating through possible variables.

The solutions manager 11 (see FIG. 2) is the work engine that will construct the solution procedure and carry out the duties assigned to the problem manager 7 by the user. It manages all the iterating variables and calls on the modules to carry out evaluations and return with solutions. It keeps track of these solutions as they are generated. This means that a module 1 will never be permitted to generate solutions without the knowledge and supervision of the solutions manager 11. If a module 1 finds that it is being instructed to breach a limit of one of its own constraints, then it will complain—i.e. provide feedback to the controller. The matter will then be referred to the constraints manager 9. In this way, unnecessary iterations can be prevented. While in most situations it is advantageous to avoid unnecessary iterations which are caused by a breach or conflict with the constraint of a particular module 1, the user of the system may be interested to know of more efficient solutions which are prevented from being generated by a constraint. One example might be that the packaging machine at the users plant is only capable of using bags of particular capacity. However, the user may want to know of solutions outside the constraint boundary for bags that would lead to greater efficiency. The user may be currently using a bag of a certain type to pack sultanas at their plant and have specified this as a fixed constraint. However, the user may be open to using a different type of bag once stocks of this particular bag are exhausted. Thus the user would be interested in knowing whether there are more efficient solutions which conflict with this particular constraint. The solution manager can be programmed to flag any such solutions or, for example, to flag all solutions which have a greater efficiency than the solution which falls within the constraint boundary. This might cause the user to redefine the constraints.

The solutions manager will receive from the problem manager 7, problem algorithm structure and constraints that exist between each of the modules 1a, 1b, 1c, 1d and 1e. Selected selection is dependant on the sequence in which they were linked/constructed by the user.

From the initial assessment by the constraints manager 9 as to the extent and shape of the global solution space 21, solutions manager 11 is able to prepare a table of all the iterating variables and the combinations in which they require evaluation by the modules. The number of combinations will be the same as the number of solutions that are required to be evaluated.

The solutions manager 11 will call on each module 1a, 1b, 1c, 1d and 1e to evaluate each option and to return with a solution. Solutions manager 11 will then consolidate the solutions (e.g. list the solutions by their costs) and store them until the process is completed.

Solutions manager 11 has the option of sending out the requests to each module 1, either singly ("here is one evaluation to do and come back with an answer before you get another one") and/or in batches. If the requests are batched up then this implies parallel processing.

If a module 1a, 1b, 1c, 1d and 1e is asked to breach one of its constraint boundaries it will advise the solutions manager 11 and the matter will be referred to the constraints manager 9 for resolution. Alternatively, the controller may relax some constraints automatically within known bounds—for example, if a predetermined condition is met such as the solution is within an allowable tolerance of the constraint boundary. The constraint might only be relaxed if the solution outside the constraint boundary is otherwise much better than solutions within the constraint boundary. If it can't be resolved by the constraints manager 9 the problem manager 7 is informed so that a user can resolve the conflict.

When all combinations have been assessed by all modules 1a, 1b, 1c, 1d and 1e, solutions manager 11 presents the solutions. These are in a form that allows rapid resorting, for example:
- by an objective function (eg cost),
- by any single variable of the objective function,
- solutions that obey all constraints,
- good solutions available through relaxing some constraints.

The solutions manager 11 is also responsible for providing:
- a product specification output file or design brief and if no solution is available it will notify a third party—for example, by a messaging system such as e-mail—who will come up with a solution that will then be added to the system for specification delivery,
- a summary of the model and the constraints, data and assumptions made in the creation of the solution,
- printed output,
- formatted reports for popular word processor and spreadsheet languages,
- other data output.

The constraints manager 9 maintains a global understanding of the constraints from each module 1. Constraints manager 9 consolidates all these constraints and removes any overlap which would cause unnecessary calculations to be carried out. This is done when called into action by the problem manager 7 for an initial assessment and also on an ongoing basis when conflicts with constraints are reported to the solution manager 11 using the feedback means provided in each module.

An initial assessment request from the problem manager 7 involves:
- advising whether (and why) the problem is over constrained and where there are no feasible solutions,
- advising of any tightening of upper and lower constraints on variables caused by constraints evolving from other modules 1 or process linkages,
- advising of the upper and lower bounds of the iterating variables and the number of steps between for which solutions will be generated. This will indicate the maximum number of solution iterations required from the solutions manager 11,
- a advising if the solution manager 11 is going to find itself in an endless loop and some redefinition of the problem is required,
- advising if there are two or more independent/separate problems that are not interconnected, Constraints manager 9 refers back to the problem manager for correction to the problem definition with suggestions as to an acceptable correction.

Subsequent calls to the constraints manager 9 occur when the feedback means reports problems to the solutions manager that escaped the initial difficulty vetting and requires resolution. These might be such things as:
- data sourced from an outside file or data base for use during the iterations cannot be found or is illegal,
- solutions manager 11 is in an endless loop and requires the constraint manager 9 to resolve this.
- solutions manager 11 has been advised by a module 1 that it is being asked to evaluate a solution that is violating a constraint. This was not discovered during the initial assessment and the constraints manager 9 must decide on a course of action such as:
  - reset the bounds on one or more of the fuzzy constraints for that module 1. Tell the module 1 to adjust accordingly and then tell solutions manager to proceed,
  - tell solutions manager to cancel out that particular iteration and proceed with the next,
  - tell the program manager 7 that there is a serious problem and the user needs to be consulted for a resolution.

The controller maintains control over:
- the variables defining each valid module/specification combination,
- the algorithms, equations or constraints that effect these variables,
- the other modules 1 that need to be activated in order to find a value or a range of values,
- if the variable is altered then which other modules 1 need to be notified,
- whether any of the variable interdependencies form a loop (eg A=B and B=A),
- whether any of the variable interdependencies are over constrained (eg A>B and B>A),
- whether the selection of a particular problem configuration (module/specification) means that some of the required variables and options are not available (eg only available from a module that is not nominated for use).

EXAMPLE 1

An example of how the packaging chain for a product is specified is set out below. The example has been simplified in order to facilitate understanding. The example concentrates on the dimensional aspects of a problem, because this provides the simplest method of demonstration.

The user specifies the problem using the following options. Referring to the table shown in FIG. 10, the software modules 31a, 31b, 31c, 31d, 31e and 31f are displayed in the columns and the specification outcomes 33a, 33b, 33c, 33d and 33e required for each module are displayed in the rows. Typically, the table shown in FIG. 10 would be part of a graphical user interface managed by the problem manager 9 which would allow the user to specify the problem. The graphical user interface may allow the user to load previous problems and modify them to produce a new problem. In this example, only software modules 31a, 31b, 31c, 31d, 31e and 31f are required and only specification outcomes 33a, 33b, 33c, 33d and 33e are required. Module 31a is required to generate specification outcome 33b; module 31b to generate specification outcomes 33a, 33b, and 33d; modules 31c and 31d are required to generate specification outcomes 33a, 33b and 33e; and software module 33b is require to generate specification outcomes 33b and 33e.

In the example, software module 31a is used to specify the product, software module 31b is used to specify the primary pack which is a wrapper, software module 31c is used to specify the intermediate pack which is a carton in which wrapped products are packed, software module 31d is used to specify the box in which cartons are packed, software module 31e is used to specify the pallet on which the boxes are loaded, and software module 31f is used to specify the retail space on which the cartons are placed. Referring to FIG. 10, it will be apparent that software module 31f is not needed to produce the desired packaging specification. A number of specifications are available although not all specifications will be relevant for each software module. The specification outcomes in the example are those aspects of the problem which the user wishes to specify or evaluate—i.e. apply constraints to.

To specify the problems the user nominates process linkages for the size specification. In FIG. 10, process linkages are indicated by arrows. FIG. 10 shows that the user has selected the process linkages of: Product to wrapper to carton to box to pallet. To simplify this example, the variables, equations and constraints defining these linkages are described together with those of the down-stream module. No product manufacturing linkages have been included in this example.

With market research advice, the user nominates the following size constraints in the size specification outcome 33b of the product software module 31a:

Length of product Lp—between 110 mm and 150 mm.
Width of product Wp—between 25 mm and 30 mm.
Depth of product Dp—will be 7 mm exactly.

To provide the exact weight requirement, the product volume must be 25 cubic centimeters and this is also nominated by the user as a constraint on the size specification outcome 33b.

These constraints are summarised in the table in FIG. 11 where the left hand column shows the variables being constrained, the middle column indicates whether those constraints are fuzzy i.e. whether they can be breached in the search of superior solutions and the right hand column indicates whether the variables are being iterated or not. A constraint is a fuzzy constraint if it can be relaxed in order to overcome a conflict whereas it is not a fuzzy constraint if it must not be relaxed. In this case, the only non-fuzzy constraint is the volume of the material because it is required to ensure the correct amount of the product. As the depth of the product is fixed at 7 mm this variable is not iterated.

The wrapper will be selected from a database of styles. This is selected in the style specification outcome 33a of the wrapper software module 31b. It must be a style that will help sell the product, provide good barrier protection and be easily opened by a consumer. No tamper protection or child proofing mechanisms are required.

The software to select appropriate wrapper styles incorporates an expert system designed to receive fuzzy constraints from a user (e.g. slider bars to indicate the degree of concern on a number rating issues). In this example, the limitations of the manufacturer's equipment has restricted the choice of wrappers to one that they currently use on another product.

The wrapper size outcome 33b is specified by the wrapper software module 31b. The wrapper dimensions for the selected style are to be based on the product size. There will be one wrapper per product. The wrapper length Lw must be 20 mm greater than the product length Lp and the wrapper width Ww must be sufficient to wrap around the product and allow 25 mm for a seam. These constraints are summarised in the table in FIG. 12.

A marketing department decides that the wrapper is to have graphics on its face and back. This required outcome is specified by the "YES" in the intersection of the wrapper software module 31b with the graphics outcome 33d. In particular the face must show:

a graphics name display which measures 80 mm×15 mm which is to be displayed lengthwise, a company logo of 20 mm×20 mm in either orientation, and a bar code of set dimensions 30 mm×10 mm in either orientation.

There must be at least 5 mm spacing between each display and none of the displays are allowed to bend around to the edges of the wrapped product.

The back of the wrapper contains sundry graphics information, but this provides no size constraints.

In effect, the marketing department's input has also placed constraints on two of the product dimensions so that the wrapper can adequately carry the intended decoration. These constraints are shown in the table in FIG. 13. Note that the two different orientations shown in the table are those which are possible given the constraint on the orientation of the graphics name.

The carton will then be selected from a database of styles. These are specified at the intersection of the carton software module 31c and the style specification outcome 33a. It must be of a style that can placed on the supermarket shelf. It will perform as a package (protect the product during transport), as a dispenser (allow shoppers to select the product from the front or top of the carton) and as a display item (advertising the product to the shopper).

The software module used to select appropriate styles incorporates an expert system designed to receive subjective input from a user (eg slider bars to indicate the degree of concern on a number of rating or measure issues). For nominated dimensions, all the carton styles that meet the requirements, are extracted from a database of all possible styles.

In the example, the criteria input, with an associated rating or measure, into the style software module are as follows:

carton bulge>5/10 stacking strength>8/10 top/front opening=10/10

For some height, width, and depth combinations there would be no valid styles and it would be necessary for a user to alter the criteria or select a carton not matching all of the criteria, and for some there may be up to 10 styles. These selected styles can have different efficiency ratings. In the present case, the carton having the best efficiency rating is selected.

The carton's use also dictates a number of size constraints which are specified in size specification 33b of the carton software module 31a:

Shelf replenishment criteria demands that there be 2 cartons deep on the shelf. This means a maximum carton depth Dc of 250 mm.

The product presentation requirements (and shelf space costs) constrain the width of the carton Wc to be the same as the length of the product Lp and the product can be packed in the carton on its flat or on its side.

The height of the carton Hc constrained by the supermarket shelf height and is nominally set at 200 mm.

Sales, replenishment and working capital issues constrain the carton to hold between 20 and 30 products.

A packing allowance of 2 mm in all dimensions is required.

The internal carton dimensions width, depth and height are defined as you would look at a carton on the supermarket shelf.

$P_{nw}$ is the number of products packed across the width of the carton.

$P_{nd}$ is the number of products packed down the depth of the carton.

$P_{nh}$ is the number of products packed up the height of the carton.

The constraints caused by the carton's use are summarized in the table in FIG. 14.

For all carton styles there is a specific ratio of dimensions (Height, Width, Depth) that provides optimum efficiency. This is specified in the carton software module 31c as a efficiency specification outcome 33e. This ratio will be different for different styles. Optimum efficiency gives maximum internal capacity for minimum usage of the cardboard in each carton. Non optimal cartons tend to waste board unnecessarily in oversized flaps etc. Algorithms:

calculate the efficiency of a carton style, given its dimensions, and calculate the optimum dimensions for a style of nominated volume.

Each carton style will have a slightly different algorithm.

In this example, the selected carton style and selected dimensions must be at least 90% efficient. Carton efficiency=f(style, H, W, D)>=90%.

The box will be selected from a database of styles. This specification outcome is specified by the intersection of the box software module 31d and the style specification outcome 33a. It must be of a style that can. provide good stacking strength, protection against side impact and it must be top opening.

The software to select appropriate styles incorporates an expert system designed to receive subjective input from a user (eg slider bars to indicate the degree of concern on a number of rating issues). For nominated dimensions, all the box styles that meet requirements are extracted from a database of all possible styles.

In the example, the ratings or measures demanded are:

side impact resistance>5/10 stacking strength>8/10 top opening=10/10

For some height, width and depth combinations there are no valid styles and for some combinations there may be up to 50. These selected styles have different efficiency ratings.

The size of the box and its dimensions are constrained in a number of ways and these constraints are specified at the intersection of the box software module 31d and the size specification outcome 33b:

working capital and supermarket replenishment practises have constrained the box to contain exactly 24 cartons, any of the 6 possible carton orientations may be used when packing the box, the internal dimensions of the box will equal the sum of the external dimensions of the cartons plus an allowance of 5 mm in all dimensions. This tolerance is to cover:

all the carton board thicknesses on each dimension, an allowance for carton bulge, a packing allowance, provision of stacking strength requires that the box height Hs be greater than either its width or depth, load stability requires that the width of the box Ws be greater than half its length.

The internal box dimensions Hs, Ws, Ls are defined as you would look at the box with its opening at the top.

$C_{n1}$ is the number of cartons packed along the length of the box Ls.

$C_{nw}$ is the number of cartons packed across the width of the box Ws.

$C_{nd}$ is the number of cartons packed up the height of the box Hs.

The box size constraints are specified in the table in FIG. 15.

In the example, the "YES" at the intersection of the box software module 31d and the efficiency specification outcome 33e, indicates that the box software module will optimize on the efficiency of the packaging. As in the case of cartons, all box styles have a specific ratio of dimensions (Length, Width, Depth) that provides optimum efficiency. This ratio will be different for different styles. Optimum efficiency gives maximum internal capacity for minimum board usage. Non-optimal boxes tend to waste board material unnecessarily in oversized flaps etc. Algorithms:

calculate the efficiency of a box style, given its dimensions, and calculate the optimum dimensions for a style of nominated volume.

Each box style will have a slightly different algorithm.

In this example, the selected box style at its nominated dimensions must be at least 85% efficient. Box efficiency=f(style, H, W, D)>=85%.

The boxes are to be transported and stored on a standard pallet (1165 mm×1165 mm×150 mm). There must be no overhang and the boxes must be upright. They cannot be stacked on their side or end.

Also the vertical stacking height is important. The full pallet must be capable of loading 2 high in a shipping container (2800 mm internal height). This means that the sum of the box heights on a pallet can not be greater than 1250 mm.

There is an algorithm to provide the pallet patterns for any nominated box dimensions. These pallet patterns are quantified by a measure of efficiency. This efficiency is the percentage of pallet surface area that is covered by each layer of boxes. In this example, pallet efficiencies less than 90% will be discarded.

For any box height Hs, the maximum stacking height of 1250 mm will dictate how efficiently the head space in a container is utilised. Some of the product is to be exported and this 95% is set as a minimum vertical efficiency.

Both these efficiencies together indicate a minimum volumetric efficiency of 85%. This would then be flagged as a fuzzy constraint.

The conventional way to solve this problem is to treat it as a sequential process:
1. The product module would optimize within the constraints provided for that module and generate a set of specifications for the product.
2. The wrapper module would optimize within the constraints provided for that module and using the specifications from the product module, would generate a set of specifications for the wrapper.
3. The carton module would optimize within the constraints provided for that module and using the specifications from the product and wrapper modules, would generate a set of specifications for the carton.
4. The box module would optimize within the constraints provided for that module and using the specifications from product, wrapper and carton modules, generate a set of specifications for the box.

This has a number of problems:

Once the specifications for a module are produced, they are rarely revisited. There is no feedback from downstream modules to earlier modules.

Most modules have a significant number of attractive alternatives and it is imposing unnecessary constraints on the downstream modules by locking in to a single solution prematurely.

A common outcome is that the downstream modules become over constrained and are rarely able to produce specifications that are near optimal.

There is often very little justification for treating these types of problems sequentially and there is much to be gained by not doing so.

Problem Solution:

Phase 1: Broad Conceptual Definition by USER.

Figure 4:
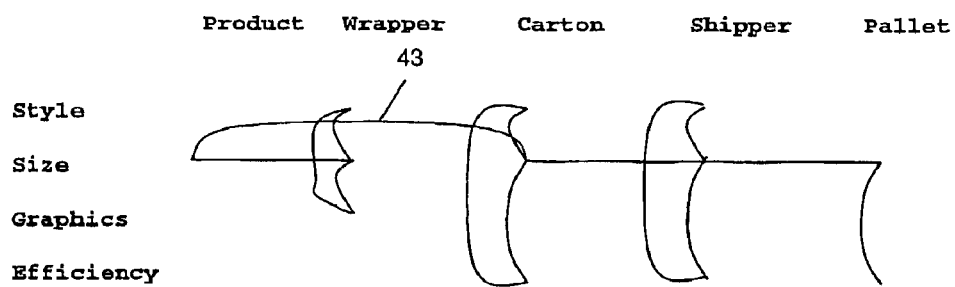
FIG. 4 illustrates the independencies of various modules according to the preferred embodiment.

From the definition provided in this example (expert systems, algorithms, variables, equations and constraints) it can be seen that although each module can be operated in isolation, there is a high degree of interdependence. These interdependencies are illustrated in FIG. 4. Line 43 shows the interdependence of the size of the product and the carton which exists because of the various constraints which link the size of the carton to the size of the product. Each of the lines can be considered as specifying a directional interdependence.

Phase 2: Detailed Definition by USER.

The Problem Manager 7 will interact with the user to provide detailed data on each of the modules selected in phase 1. Problem Manager 7 is responsible for collecting data defining any of the vertical linkages between specifications within the same software module 31a, 31b, 31c, 31d, 31e and 31f. It is also responsible for any horizontal linkages between different modules. Some of these horizontal linkages will be product related and others will be process related. In this example, all of these data (variables, equations, constraints, expert systems etc) have been described in the General Problem Description.

Phase 3: Set Up and Edit Checking.

Control will then pass to the Constraints Manager for an initial assessment to identify areas of conflict. This example illustrates one such area that would be quickly discovered.

From the constraints in the product software module 31a, the Constraints Manager 9 would calculate the permissible product dimensions from the constraints in FIG. 11:

These permissible dimensions are shown in the table in FIG. 16. Product length Lp can be varied from 120 mm up to 135 mm and corresponding widths would be from 29.8 mm down to 26.5 mm.

The wrapper software module also provides constraints on the product dimensions. These constraints are independent of those imposed by the product software module 31a and for quite different reasons. This wrapper software module 31b is saying that there are two permissible graphics orientations which:

require the product face to be at least as big as 140 mm(Lp)×20 mm(Wp), or require it to be at least as big as 120 mm(Lp)×30 mm(Wp).

There is a conflict between the wrapper module and the product module because the constraints placed on the size of the product by the product software module 31a conflict with the constraints placed on the size of the product by the wrapper module—i.e. there are no acceptable sizes of the product which will provide sufficient room for the graphics chosen by the marketing department.

Following feedback of this problem to the solutions manager 7, the constraints manager 9 will request that the problem manager 7 report back to the user with:

a description of the conflict, a suggestion as to possible resolutions, a default resolution that the user may accept or over ride, a request for permission to proceed.

In this example, the suggestion from the constraints manager 9 would be to use licence provided by the fuzzy constraints and lock in a single product size of 120 mm×29.8 mm×7 mm and alter the graphics accordingly.

In the example the user rejects this advice and decides to redefine the wrapper constraints. The user decides to allow a range of product sizes by allowing the company logo to overlay the graphics name area. This will allow more flexibility for the carton and box modules to find good solutions.

With this change, the product length could vary from 120 mm to 140 mm with the corresponding widths reducing from 28.8 mm to 25.5 mm as shown. The solutions manager 11 would then generate 21 alternative product sizes for product lengths (120 mm to 140 mm in 1 m increments).

Phase 4: Solution Generation.

Before starting to iterate through all the possible solutions, the solutions manager 11 decides which other iterating variables are to be used and the best step size for each. Its task is to generate a reasonable number of quite different yet highly attractive solutions. The user can then sort through these, applying subjective judgement to make a selection.

In this example, the iteration count might be determined as the product of:

21 product sizes, 1 wrapper size per product size, 2 orientations of product in carton, 50 carton sizes per orientation, 5 carton styles per carton size (average), 6 orientations of carton in box, 30 box sizes per carton size/orientation, 25 box styles per box size (average), numerous pallet patterns per box size.

This multiplies to 94.5 million combinations for testing. Very few of these would complete the entire evaluation. Many would be discarded at an early stage when they caused a constraint in another software module to be breached. Others would be discarded before completion when the cost was too high or operating efficiencies too low. The comparison would be with other solutions already calculated and saved. The Solutions Manager 11 aims to end up with a finite number of solutions, for example—between 50 and 100 solutions—for examination. It would attempt to make sure that this selection did not constitute minor variations on a theme. It would also try to retain a good cross section of choice across all the iterating variables listed above. The optimizing parameters would be the efficiency measures for both the carton and box.

In the example, the solutions manager 9 provides information that there are no feasible solutions. It advises that there are a number of solutions available but only when one of the fuzzy constraints is violated. These constraints would be identified and would provide a clue as to where a user might be over constraining the problem.

If for example, the problem manager 7 had great difficulty in meeting the volumetric efficiency specified for the pallet module 31e, the constraints manager 9 would be able to track back through all the constraints from this and other software modules to advise which fuzzy constraints could be relaxed to help solve the problem. The constraints manager 9 advises the user through the problem manager 7 that almost all constraints in all software modules are effecting the efficiency of the pallet module. The user may then decide to solve the problem in the pallet module and allow any stacking configurations (stacking on the end, on the side or even different configurations for each layer). This subjective assessment of priorities (lower productivity at the palletiser against minimising transport and storage costs) by the user allows the problem to be run a second time with acceptable solutions being generated.

After the iterations are completed, the selected solutions are listed in a table with each specification output and optimization for each module being allocated a column. Any column could be selected as a sort key.

Phase 5: Solution Review.

After assessment of the selected solutions, the user may wish to make changes to some of the constraints and re-run the problem.

There may be a very narrow selection of certain variables (eg carton styles). This would be a warning signal to the user as it could indicate that the problem was excessively constrained in that module.

There may have been some solutions that were far superior to all others and show up an area of investigation that requires detailed focus. This would require tightening some constraints to generate more solutions in the area of interest.

Another software module which has yet to be described, because it was not used in the example, is the retail software module 31f. This module 31f is used to specify constraints which will allow primary packs (retail packs), which in the foregoing example are cartons, to fit on retail shelving or within other possible points of sale storage areas such as horizontal or vertical freezers or refrigerators.

Retail packs for purchase are often arranged, in a retail environment, according to quite strict rules that allow the given display to return to the retailer a maximised amount of profit, based on turnover.

One of the measures used is sales per area or volume of shelf available. The primary objective of the retailer is to have an optimum number of packs on display, often a few more than the actual number in a full case. Thus replenishment is able to occur before an item is out of stock and lost sales occur. The optimization that occurs in determining what arrangement of goods to display, in retailers, where and how many of each is currently handled by many well-known space management tools. Known commercial tools include Apollo which is available from Information Resources Australia Pty Ltd, (also known as Information Resources Inc.) and Spaceman from ACNielsen Australia (also known as ACNielsen Corporation).

What is of interest in the retail software module is that it allows assessment of the number of packs on a retail shelf for a given total packaging solution dynamically, thus allowing the person specifying the overall packaging specification to vary other elements in the packaging chain to get an improved result in terms of the manner in which the product is displayed on the retail shelf. This operation would previously have been made by marketing or other personnel remote to the design activity, using a part of the previously described space management tools once the packaging had been fixed—thus leading to the possibility that a packaging design that is otherwise efficient fails at what is arguably the most important step—presentation to the consumer.

For the retail software module 31f to operate, certain constraints for the given category in the retail environment must be known; such as some minimum shelf dimensions, the amount of room required to pick items from the shelf and permissible arrangements of packs on the shelf.

With these understood, the retail module may be used to check for number of facings shown and number cases on shelf, etc. These can then be used to optimize the overall packaging design by specifying the number of facings which must be displayed per unit area of retail shelf, thereby constraining the rest of the packaging design. If sales movement data is known, the retail module 31f can determine the optimum number required to be displayed. The solution can be displayed graphically by showing the amount of space not used in each direction and could form the basis for determining which dimensions of the pack should be changed in order to improve the efficiency.

The retail module typically interacts directly with either the dimensions of the product or the carton on which the product is stored depending on how the product is stacked on the shelves—i.e. whether this is individually or in cartons of the product. Therefore, the retail shelf module primarily has interdependencies with the specification of the size of various of the other elements. However, as it would be understood from the above example that the size of particular elements will also interrelate with style and graphics etc.

The specification outcomes 33 discussed above are associated with software modules for carrying out iterations relating to that specification outcome. In the preferred embodiment, the various modules e.g. size, style etc are used across the software modules relating to the various parts of the packaging design. That is to say, the product module uses the size module to calculate size related solutions as does the box module. However, in an alternative embodiment, specialised size modules could be provided for each of the packaging design modules. Some possible modules for use in relation to specification outcomes are described below. As each module iterates through possible solutions it may need to call on other modules to provide solutions for example, to produce a package of a certain size the size module may call on the material module to determine whether a particular material will be needed. That material may have different thickness than the material used for a pack of different dimensions. Therefore, the size module needs to be able to determine the external dimensions of a carton.

Figure 5:
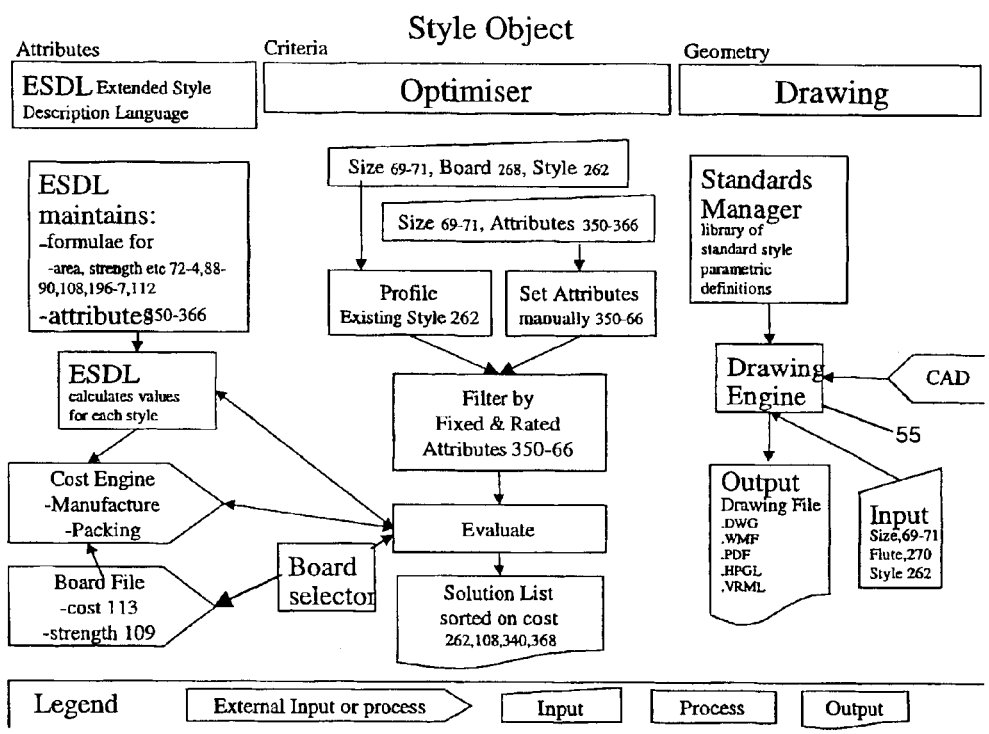
FIG. 5 shows one manner in which a style module can be configured.
Figure 6:
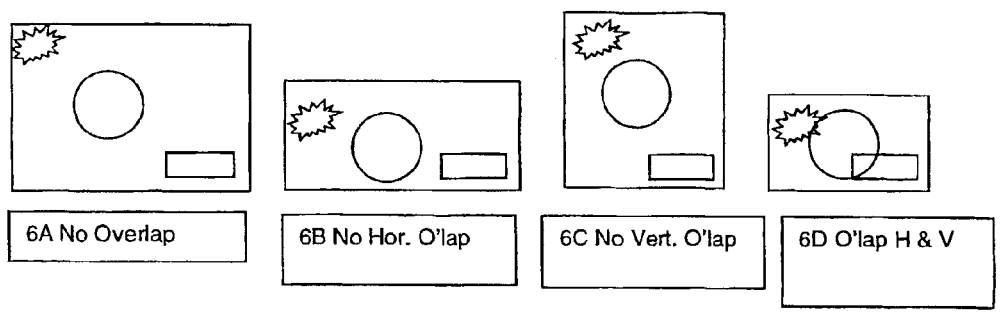
FIG. 6 shows various different graphic arrangements.

Referring to FIG. 5, the style module includes a drawing engine 55 having a library of parametric designs which generate blank drawings with a minimum of input for use by CAD and other systems allowing the various styles to be displayed to a user for selection.

An attribute manager maintains style information other than geometry using the ESDL (Extended Style Description Language) it defines the properties of the style such as: blank size, strength, external dimensions, Knocked Down Blank dimensions, Length of Rule, Manufacturing Class, etc. It also maintains the Fixed Attributes and Rated Attribute scores. ESDL can maintain information relating to all packaging types.

The style optimizer presumes a given size or size range and searches for a style compatible with that size. However, it may alter dimensions (ie. swap Length and Width or Width and Depth etc) to find a more efficient shape—e.g. for less board usage.

Fixed attributes set as constraints are then used to cull otherwise allowable styles on a go/no go basis. Examples of these fixed attributes are open, closed, crashlock, carry handle etc. That is to say, fixed attributes are those which are either present or not, therefore, if a fixed attribute is specified the style module is constrained to look for style solutions having the fixed attribute.

Rated attributes are those where the characteristic is given a rating based on a method of assessment for comparison purposes. Rated attributes include:

ease of Assembly, ease of Closing, side Cushion, top Cushion, bottom Cushion, total Cushion, compression strength, resistance to side wall bulge, resistance to bottom Sag, security of top closure, security of bottom closure, total Security, appearance, graphics Friendly, top, Bottom and Total Seal (leakproofness), and pilfer Resistance.

The scores of the rated attributes taken together, make an attribute profile for each style. This profile describes the characteristics of the style, and for the purposes of Sales and Marketing highlights the features and benefits of the design. The profile can also be used to set a minimum requirement when looking for new alternative styles ie the existing carton is the reference or benchmark and its attribute profile is used to find other styles whose attribute scores are equal to better than, or close to those of the reference style. All or some of the attributes can be selected as constraints, a tolerance can also be set to allow scores below the reference within a given percentage. Usually, the style best matching the selected constraints will be selected. That is to say, the user may specify desired attributes for a packaging style. The user may also specify the desirability of particular attributes. That is to say, the user may give them a ranking typically by selecting using a slider bar to specify the relative importance of that feature. For fixed attributes the user can specify whether a packaging style must have a feature, must not have a feature or whether it doesn't matter whether it has the feature. For rated attributes the selection would usually be out of a scale of 0 to 10 in terms of desirability of that attribute. The style module incorporates comparison means for comparing the desired attribute with the attribute profile for each style and for producing a list of packaging styles whose attributes are most closely related to the desired attribute. The comparison means would typically produce a measurement such as a score to allow the user to compare how closely a particular packaging style is related to the desired attributes and then select a particular style. The packaging styles may be displayed on a display for the user to make a choice between styles or the software can handle the selection automatically. The system then would typically include other means for ranking solutions such as the cost of individual packaging styles. Therefore, the user may select a packaging style which has attributes which are not the most closely related to the desired attributes because of cost benefits associated with that packaging style. The system for selecting a style can operate independently of the overall system for specifying a product.

A typical application is:

1. Set the fixed attribute constraints such as excluding 'open' styles if 'closed' is required.
2. Set the profile of an existing package as the reference which will allow only styles with the same or better attribute scores in a solution list ranked, for example, by cost.
3. The cost ranking can be set to manufacturing cost or packing cost or both.
4. The board optimizing flag can be set ie if the strength of a new alternative is stronger than the reference style by enough to downgrade the board then this is taken into account in the cost comparison.
5. Select optimum style from solutions list.

Style related algorithms are based on lower level mechanisms within packaging designs. The Style Description Language (SDL) is based on the identification of mechanisms in packaging designs which are discreetly identified within the Style Description Language coding system developed by the applicant. This coding system is used to associate attributes with the packaging mechanisms: the attributes are accumulated from each of the components or mechanisms that make-up that style to provide a profile for that style. Style attributes include: strength; board area; percent above minimum board area; ease of assembly; ease of closing; cushioning; security of top and bottom closures, etc. Attributes can be determined either experimentally or based on the experience of packaging designs.

Ease of Assembly and Closing

The assembly and closing attributes are based on the number of panels to be folded as well as the number of extra operations such as gluing or stapling, that are required to erect and close the completed pack.

Cushioning

Cushioning is created from the design of all faces. The rating is also based upon the number of full panel coverings of the faces ie. the number of thicknesses that fully cover the top, bottom and walls. Together the ratings give the total cushioning capability of the style as an aggregate but they can also be applied individually ie. End Side or Bottom Cushion.

Bulge Resistance

Bulge resistance, which is a function of panel design and material, is a measure of a panel's resistance to lateral force(s).

Security of Closures

The security of closures is the rating for measuring the resistance of the closure to the contents spilling out because the closure has failed. Security of closures can be related to the End, Side, Top or Bottom of the pack individually or as an aggregate ie. a general security rating for the whole pack.

The security is measured by:
  Evaluating the number of full panel wall connections of the closure, so for example a tray has 4 full panel wall connections but the Regular type closure only has 2 half panels (=1) and 2 partial flaps (=0.6).
  By the number of full closure thicknesses.
  Resistance to shear of the panels—i.e. stopping panels sliding laterally as walls bulge.
  Resistance to tensile forces from the contents wanting to burst open the closure vertically.

Appearance

The appearance attribute relates to the number of raw edges able to be seen from a three-quarter view of the pack. A three-quarter view is Top Side and End panels. When mechanisms ratings of raw edges are combined some actually reduce the number of raw edges because they cover up raw edges of other mechanisms Graphics Friendly This attribute relates to the way in which panels of the erected package relate to each other from a graphics point view. The measurement is the number of points of potential misregister ie. the number of adjacent panels across which graphics may be intended to flow, but because the panels are not directly connected then misregister can occur.

Sealing

The sealing attribute is based on determination by an expert design group of how likely it is that the closure would 'leak' various types of objects which indicate the rating. The highest leakproof rating is for a liquid, the rating decreasing with the progression to powder, grain, ball bearings, tennis balls and brick. These assessments are quite acceptable and can be made with a high level reliability by designers fully familiar with the mechanisms and their application in the past.

Pilfer Resistance

This is effectively the opposite of "ease of closing" ie., if the style is easy to close then it is also considered to be easy to open for the purposes of pilfering the contents. Certain mechanisms however require the closure to be ruptured before access can be gained hence adding to pilfer resistance of the closure.

An expert team of designers employed by the applicant, having determined the attributes rating methods, subsequently established all the mechanisms used in the business currently, and assigned attributes to them. Attribute ratings were then established for all the styles in the drawing library using a specially developed program which determines the mechanisms in the style and accumulates the mechanism ratings. The program was written specifically to do this aggregation of attributes from the mechanism level to the style level and the program includes some sophisticated algorithms and rules to apply when combining attributes so that the results are logical, consistent and accurate.

There are also fixed attributes which are assigned by the program; these attributes do not have a rating, they are characteristics which are either there or not. For example, certain trays have an open characteristic whereas a wrapper typically will be closed. Other fixed attributes are things such as carry handles, mechanised, crashlock etc. These are mostly determined through analysis of the Style Description Language code.

This method of measurement or assessment of these kinds of attributes is not known to have been done before in the Packaging field.

The style module seeks to determine the optimum package style for a given size, which satisfies certain criteria ie. it delivers a certain minimum set of attributes at the lowest cost. The cost is both the cost of manufacture of the package and the packing cost ie the costs associated with erecting loading and filling the pack. The user can select attributes and set the required rating by using a slider bar which indicates the level of importance and minimum rating required. The rating profile is then used to filter a selection of package designs which satisfy the criteria and these are ranked in order of lowest cost.

There are fixed constraints that can be applied such as the global exclusion of open cartons for example when a closed solution is required. A typical application would be to identify the existing design within the library and to use it as the benchmark or reference, the attributes of the reference style will set a profile which will apply constraints and filter out those styles which satisfy the minimum attribute scores. The use of the cost module ensures that the optimum solutions are based on real costs. The module also determines the packing costs, these are the costs incurred by the customer when erecting packing closing and sealing the pack.

The costing module is invoked when cost is part of the specified problem (eg. optimization function) or if cost is not part of the specified problem to determine the cost of a selected solution or solutions. The costing module can calculate the total or partial cost of supply (manufacture and transport) of a packaging order. The costing module has sub modules including, for example, a production cost module and a transfer cost module which are invoked by the controller. The costing module is dependent on the style module for style related information such as manufacturing class (specifying manufacturing activities required), blank dimensions, and knocked down blank dimensions, on the material module for board grade and flute information, and on the pallet module for fitting collapsed (knocked-down) cartons on a pallet for shipping to the customer.

The controller initialises the production and transfer modules by loading site-specific configuration information—i.e. constraints relating to a company's particular plant set up. The controller calls on the production and transfer modules of the costing module as required to calculate total or partial cost of supply, or optionally to optimize the manufacturing process for minimum cost.

The costing module can operate in two modes: non-optimizing and optimizing. When operating in non-optimizing mode, the material, production and transfer modules are queried once each to get the production and transfer costs respectively for a particular part of a packaging chain. The machine route is defined to enable actual cost estimates to be obtained. These costs are simply added to obtain the total cost, which is returned along with a complete cost breakdown to the controller for reporting purposes.

When operating in optimizing mode, the production module is asked to provide a list of machines which can be used to manufacture the requested style. These are in effect variables through which the solutions manager 11 can iterate. The characteristics of machines may be stored in a database and retrieved based on a customer profile. The constraints manager 9 then maintains a master list of all the options and ranges of operation of all machines that will take part in the manufacturing process, and the solutions manager 11 iterates through all the combinations and permutations of settings. The solutions manager 11 stores the final production cost in each case. Once complete, the lowest cost path and corresponding settings can be used by the problem manager as one method of ranking solutions to the problems.

The production module manages numerous "micro-modules" which define the operation of each type of machine that can be used in the manufacturing process. During initialisation, the production module loads site specific parameters for each machine, enabling the exact behaviour of each specific machine to be accurately modelled.

Each machine has common properties like run rate (machine speed), run waste, setup time, and setup waste, as well as fixed, variable, and labour costs (per hour of operation). Some machines also take several minutes to build up to full speed, and this ramp in production (known as rolling setup) is also-described and modelled.

The costs of specific materials used by certain machines for manufacture (eg: glue, ink, die, printing plate) are also described in the site specific parameters, and these are used to calculate add on costs over and above the standard running and labour costs.

Operating variations unique to each machine are described using machine specific "degradations". Degradations affect major machine operating behaviour such as setup time, run rate (machine speed), setup waste, run waste, and extra crew requirements. Properties of the package style being manufactured that bring different degradations into effect include sheet size, board class, flute group, number of ink colors, ink coverage, number of glued joints, and in the case of die-cut styles, the number and arrangement of cartons in die.

For each set of variables which are being iterated through, the production module is able to check that the board blank can fit on each machine in the specific manufacturing path. If it cannot fit on any one machine, the solutions manager 11 and the constraints manager 9 will be informed by feedback means and the solutions manager 11 will iterate to the next permutation unless the conflict needs to be resolved in order to allow solving of the problem to continue—i.e. the problem is over constrained so that solutions being generated conflict with possible machinery configurations. If the specific blank defined by the set of variables can be manufactured, the total setup, run time, waste, extra material, and hence cost for each machine in turn is calculated, taking into account any degradations that may be brought to bare.

Since almost every machine incurs some kind of waste, the number manufactured is always higher than the number ordered by the customer. For example, if 2000 cartons are ordered, material and labour will be expended as if 2036 cartons were being made, but 36 are in fact wasted for one reason or another. This of course incurs extra cost in an order, and is included in the final cost report.

The transfer module calculates the cost of supplying the finished packaging to the customer in its delivery format ie. as an empty can or bottle, a flat sheet or a prefolded knocked down carton. This may include bundling and strapping the packs, fitting them on a pallet, strapping and wrapping the loaded pallet, transporting the pallets to the customer, and handling, dispatch, and selling costs.

In the case of corrugated boxes, once the knocked down dimensions (including compressed thickness) are known, the number of boxes in each bundle is calculated. The number in each bundle depends on board compression, size, and sometimes weight. The customer can nominate a maximum weight of bundle, or a number of cartons per bundle. The cost of strapping each bundle is calculated, depending on the number of straps requested by the customer.

In the case of folding cartons they are most often packed into corrugated boxes for delivery on a pallet and similar issues relating to maximum weight are considered as well as optimizing the utilisation of the pallet area when determining the number of cartons to be packed into the box.

The palletising module is then used to find the most efficient arrangement of bundles on a pallet, depending on customer requirements such as pallet maximum dimensions and storage requirements. Once the pallet arrangement is known, the total number of pallets required can be calculated, and the cost of strapping and optionally shrink/stretch wrapping each pallet is calculated.

The cost of transporting the final number of pallets is calculated, along with any handling and dispatch costs based on the total magnitude of the order. Selling and "per order" costs and any other miscellaneous costs of transferring the order to the customer are added to provide the final transfer cost.

The primary requirement of the Materials Module is to provide a set of Structural Performance Algorithms which can be used by the problem manager in order to evaluate the performance of a pack (carton, box, wrapper etc) to determine whether the pack meets required performance criteria or what material it must be constructed of in order to meet the criteria. The problem and associated solution may be approached from more than one direction. A desired outcome will be the set of materials/structural components (materials specification), which satisfy a given set of constraints and/or optimization criteria and performance requirements. The converse problem will also be addressed, where the desired outcome is one of estimating structure performance (performance specification) given prescribed material, product/design/system, constraints and environment.

Within the classes of problem addressed by the Materials Module properties, measures, properties and/or characteristics may be obtained at a number of structural levels:

1. Base Materials—e.g. paper, metal (steel, aluminium, foil etc), polymer (PET, film etc).
2. Structural Components (defined combinations of base materials)—e.g. corrugated board, multi-layered polymer films, laminates).
3. Product—e.g. folding carton, corrugated carton (defined style), aluminium can, steel can, plastic bottle and multi-layered polymer film bag/sachet.
4. Composite Packaging (integration of materials)—e.g. paper/aluminium/polymer film, corrugated/plastic.
5. Combination Packaging (integration of products)—secondary pack (e.g. corrugated box) with primary pack (e.g. cartons, plastic bottles, steel cans).
6. Unit Loads—e.g. palletized loads (single or multi-layered), containerized.

Depending on the problem defined by the problem manager 7, one or more of the above (1 to 6) structural levels will be involved in the generation of solutions. Where the structures involved are of a simple nature the performance measure provided by the materials module is directly associated with a required element of a specification. In the case of complex styles and combination packaging the materials module will determine a defined set of performance measures for the relevant substructures, which are then integrated through style specific rules of connectivity, assembly and generalized load contribution to provided an integrated product performance specification—i.e. a measure of performance.

As a secondary requirement the materials module will provide to the client a resource of base material properties and characteristics which can be drawn on for the specification of a problem, for general information or usage elsewhere.

The materials module contains a repository of base material properties and characteristics, which are classified as either:

a Typical within the industry and categorized/selected in terms of a relative performance ranking e.g. ranking 1 to 5 with 3 as average. Typically used as default data, in circumstances where a data set is incomplete and/or as a benchmark data set.

Company Specific e.g. selection from company specifications/test data.

Product/Project Specific—data/characteristic set specific to a particular product/project.

The client can select data/characteristics from the above or augment/modify in part or totally from a job specific set.

The materials module has a number of sub-modules that provide performance measures, properties and characteristics under distinct environments or categories:

1. Moderate Humidity (general load/deformation relationships—time independent).
2. High Humidity (stack survival under load—time dependent).
3. Process Control/Performance Interaction
4. Product Interaction (the interaction between packaging levels—from primary to box to pallet to container/warehouse storage and between the packed product and the primary package).
5. Analysis of complex styles—decomposition, substructure analysis and assembly.
6. Machine system interaction (ie. packaging materials interaction on packaging machinery operation).

The materials module interacts with the controller, which defines (in conjunction with the client) and manages the suitability and compatibility of constraints and data between modules 31 and the interactive process of product development and problem creation/definition. The performance and or materials solutions are delivered to this module.

The materials module also interacts with the style module which provides data and information associated with product styles involved:

Decomposition of the product into distinct sub-structural components and associated dimensions for determination of performance contribution.

Assembly/integration of the component contributions to provide overall performance measure.

The materials module further interacts with the modules which provide data/information associated with:

set of products involved, product size, product interaction information, product material and structure, storage and distribution, loading, environment.

The size module is used to calculate all dimensional factors for any object or component in the packaging, distribution & marketing chain. Dimensional factors include not just the length, width & depth, but all other factors that can be determined once length, width & depth are selected. This can include, for example, the amount of materials used to produce the carton, etc.

The size module can use a variety of variables which may be constrained and which include:

Volume—Can be an explicit input or can be calculated if dimensions were given in the size range inputs.

Weight—the gross product mass.

Size range—length, width & depth and can be given in either internal or external dimensions.

Shape range—length to width, depth to width & depth to length ratios.

Blank size range—This commonly applies to styles that fold up from a flat sheet, eg. a carton or corrugated box. This is to ensure that the sheet size required is within the manufacturing equipment range. This can also be used to force size choice that utilises the equipment efficiently. This concept can also be applied to styles not made from flat sheets. The combination of blank size range and shape range can handle any dimensional multiple and ratio constraints, and effective all size related factors.

Extras—pack bulge, nesting, clearances. These are dimensional relationships between an object and the next object in the chain.

Material factors—strength, thickness, unit weight.

The size module generates solutions conforming to the volume and size constraints or advises the constraints manager if there is a conflict with a fixed constraint.

The graphics module is used to deal with iterations needed to generate a graphics outcome 33d. The graphics module will be described in relation to the arrangement of graphics on a box but can be used for other packaging types. Further details of the graphics module can be found in Australian provisional patent application PQ9522 owned by AMCOR LIMITED.

The art module provides the means for artwork development. Artwork can contain one or more art objects types such as an art template, die-line, graphic, barcode, logo, text etc and has a dynamic nature.

Figure 19:
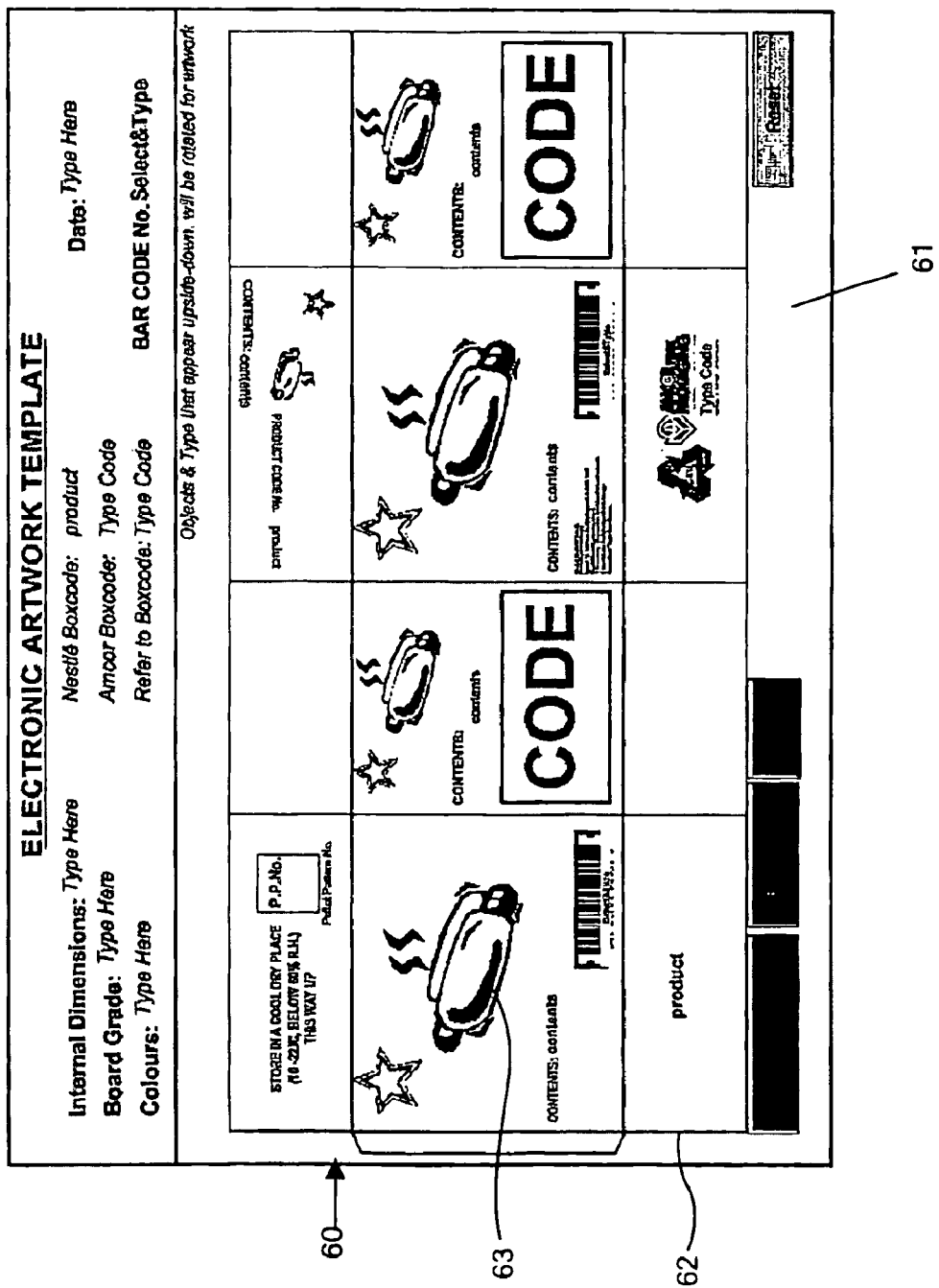
FIG. 19 is an example of a semi-populated art template.

An Art Template 60, see FIG. 19 has an associated die-line 62 with containers for number of art objects types. The template has a set of design rules (algorithms, relationships, constraints etc) associated with characteristics such as:

overall dimensions (including ratios), art object size and placement (absolute and relative)

Proximity of objects (also a function of art object type)

Overlap/interference of art object domains

Enforcement of art object consistency over and between panels. For example same art object may be required to appear on two panels, one a main panel the other a flap, with the art object on the flap required to be rotated 180 degrees relative to the art object on the main panel and to be 20 percent smaller.

Dynamic positioning of art objects with overall dimensional changes

Handling of links and means for manual and or dynamic update of art objects, eg where a change in a brand logo, centrally, is updated in a number of active artworks within which update for this object is enabled.

Positioning of print process related objects/parameters such as bleed lines, no print areas etc.

Header structure containing a range of product and or project parameters, data and information.

Figure 20:
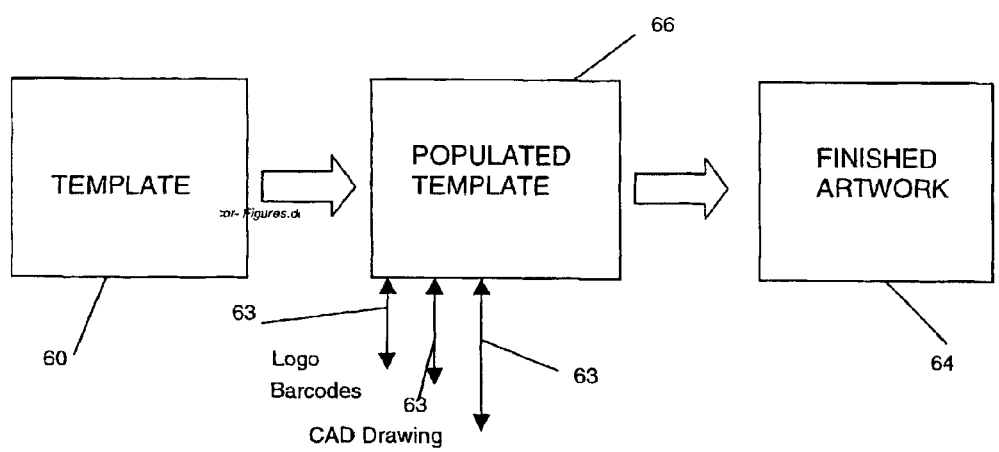
FIG. 20 illustrates the process of popularity on art template.

An Artwork Template 60 can be transformed into "Finished Artwork" 64 which is "film ready", see FIG. 20, the group of art objects 63 are used to populate the art template 60 to produce a populated template 66 with defined size, positioning etc is integrated into one finished art object 64, which is "film ready". Although some design rules, logic and header data are stripped out in this process, along with other information, some may remain embedded within the artwork file for the finished artwork. Other artwork formats may be employed for example to enable art objects to be manually positioned, prior to a finished artwork form, some design rules, logic and header data stripped out. The latter being similar to the "Finished Artwork" transformation but without the integration of art objects.

Each template 60 can use conventional coordinate geometry to define positions of panels and objects. The location of art objects in packaging artwork is best described within the frame of reference of an individual panel, this is especially useful where object arrangements are repeated in other panels. Thus, an art object arrangement can be defined essentially in a two step process where objects are positioned relatively within a first panel and then this positioning is repeated in a second panel. The specification of the relationship of one panel to another can define a relative rotation to ensure that art objects on the various panels are consistently and correctly oriented.

Figure 17:
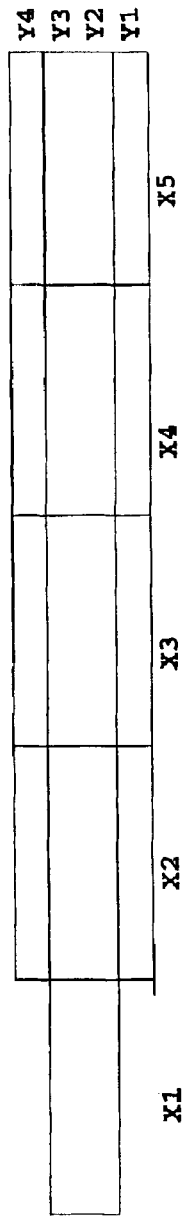
FIG. 17 is a table shows how reference frame for the panes1 of a box is established.

A panel array defines the number of panels of the layout in the X and Y directions, see FIG. 17. The expression: DIM P(5,3), for example, defines a layout with five horizontal panels by three vertical panels. After the panel array has been declared, individual panels can be referred to as P(X,Y) eg. P(3,2) is panel three across and two up from the left bottom corner of the panel array which is used consistently as the reference point. Co-ordinates can be either local or global. Local coordinates define locations within a panel whereas global coordinates relate to the whole blank. The origin of a global coordinate is the intersection of a left most and lowest panel edges of the whole layout and the origin of each panel is the left bottom corner. The local coordinates can be mapped to global coordinates and vice versa. An example is that a main panel may be required to have a barcode having 100% scaling whereas a minor panel such as a side panel may have a barcode having 90% scaling.

Referring to FIG. 17, a style blank is defined using CAD Grid eg:

```
X1 = 0              Y1 = 0
X2 = GL             Y2 = (W + A2)/2
X3 = X2 + L + A2    Y3 = Y2 + D + A2 + T
X4 = X3 + W + A2    Y4 = Y3 + (W + A2)/2
X5 = X4 + L + A2 - SL/2
```

Where L=pack length, W=pack width, D=pack depth, GL=glue lap, SL=slot width, and A2=creasing tolerance.

Panel sizes are defined using the Grid values to define vertices. The panels are mostly rectangular but can be closed polygons with any numbers of vertices. For example:
P(3,1)=(X3, Y1)TO, (X4, Y1)TO, (X4, Y2)TO, (X3, Y2)TO
P(2,2)=(X2, Y2)TO, (X3, Y2)TO, (X3, Y3)TO, (X2, Y3)TO Nine reference points are defined for each panel. PLT=Left Top PCT=Centre Top PRT=Right Top PLC=Left Centre PCC=Centre Centre PRC=Right Centre PLB=Left Bottom PCB=Centre Bottom PRB=Right Centre Individual coordinate values can also be derived from panels:
PCX=Panel Centre X value
PCY=Panel Centre Y value
PX=Panel Width
PY=Panel Height A number of variables can be constrained using the graphics module.

Figure 7:
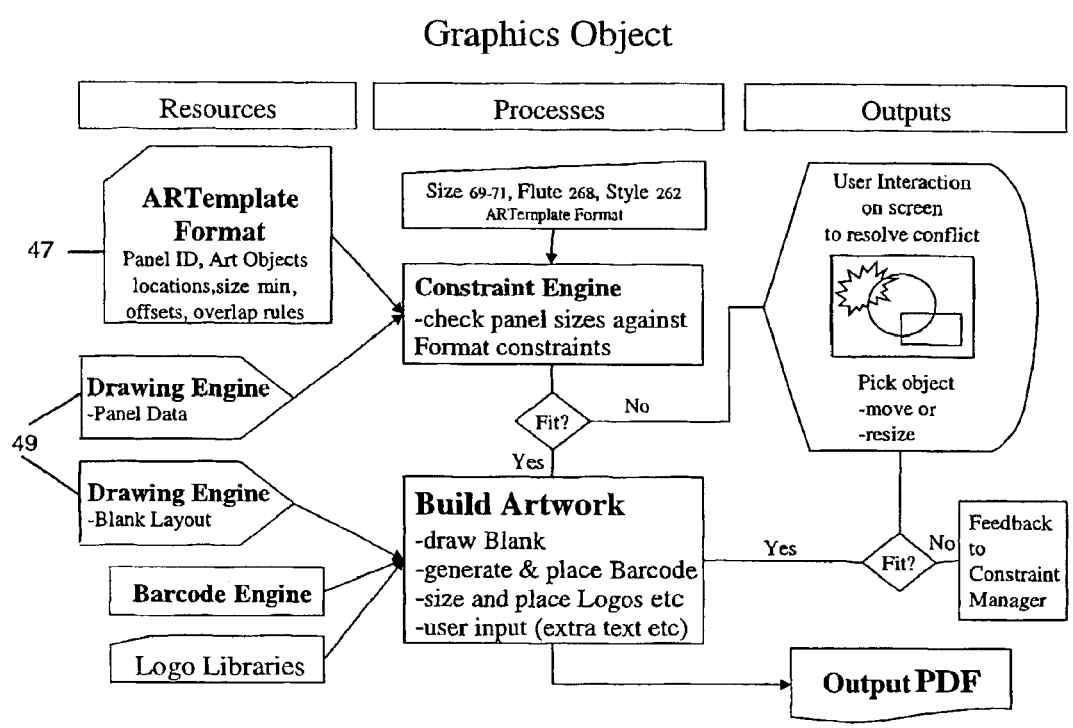
FIG. 7 shows one configuration of a graphics module.

Referring to FIG. 7, the ARTemplate Format 47 file identifies panels using the above reference system and sets out the following information:
Panel Size Constraints—Illustrated in FIGS. 6A–6D
1. Minimum Panel Size with no overlap of art object space in either Horizontal or Vertical direction, this is calculated by adding the minimum art element sizes and their offsets.
2. Minimum Panel Size with no overlap in Horizontal direction but allowed vertically.
3. Minimum Panel Size with no overlap in Vertical direction but allowed horizontally.
4. If the panel is smaller than the three minimum sizes described above then the user is alerted and can nominate art objects to adjust by relaxing size constraints or moving its location from the standard position.

Panel arrangements can represent generic style types eg JR*-R* which has a panel array (PA) of PA(5,3), TE* which is PA(3,3), TEA-L* PA(7,5) etc. These generic layouts could also be expressed using the dimensions LWD in the following manner:
JR*-R* (G,L,W,L,W)×(W/*,D,W/*).
TE (D,L,D)×(D,W,D).
TEA-L (D,D,L,D,D)×(D,W,D,W,D).

Art Objects

Art Objects are the elements that make up the panel graphics, they are typically:
Logos and Brand Names.
Standard symbols eg 'use no hooks'.
Barcodes.
Statements
  Eg 'Keep Frozen'
  Addresses.
Contents description.
Clear Spaces for ink jet printing or label application.
Ingredients tables.
Health Warnings.

These Art objects have associated with the sets of rules which can dynamically control the placement, scaling, font, color, etc of the art object.

Figure 18:
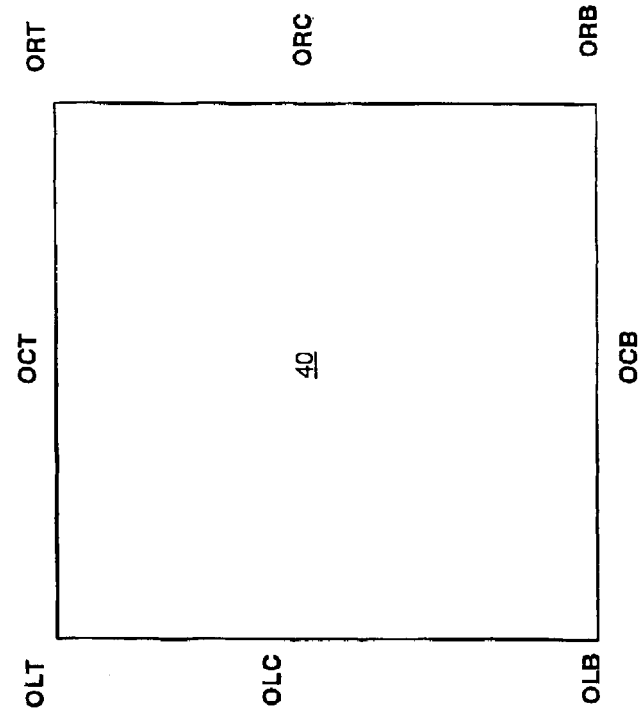
FIG. 18 illustrates the reference system for an individual panel.

Referring to FIG. 18 nine reference points for each art object 40 are identified by:
OLT=Left Top OCT=Centre Top ORT=Right Top OLC=Left Centre OCC=Centre Centre ORC=Right Centre OLB=Left Bottom OCB=Centre Bottom ORB=Right Bottom An art object can also have individual coordinate values for reference when placing other objects:
OLX=Left X
ORX=Right X
OBY=Bottom Y
OTY=Top Y For example, an object can be positioned relative to the left bottom corner of another object.

There are three ways to position an art object in a given panel; direct placement, the picture box technique, and the text box technique.

Direct placement of an art object in a panel requires a user to specify an object reference point and a panel reference or reference to a previously placed object. For example, if the user specifies OCC>PCC this places the centre of the object in the centre of the current panel. Alternatively ORB>PRB, offset (–19, 19) places the right bottom vertice of an art object at a point offset 19 mm left and 19 mm up from the right bottom vertice of the panel (this is a typical barcode object position). It will be apparent that other units can be used to define offsets."

Sizes

Art objects can be fixed or variable in terms of scalability and have:
Minimum size and optimum size (the latter can be expressed as a fixed dimension or as a percentage of the panel size eg (150 mm, 150 mm) or (30%, 20%).

Magnification range (relative to a fixed optimum or base size eg barcodes).

Minimum offset (Horizontal, Vertical) from nearest other object or panel edge.

Reposition tolerance expressed as horizontal and vertical percent of panel size (this is used when the panel size does not allow the object to be placed in its normal position but it can be moved in the direction indicated and by an amount indicated). The feedback means advises the constraints manager 9 if the graphics element can't be positioned without conflicting with a constraint and user input is required to allow repositioning or resizing.

The operation of the graphics module is shown in a drawing engine which is called to generate the blank image and panel size data. The template uses CAD blank definitions to establish panel sizes and positions so that the blank and the graphics layout can be matched in correct register.

Dimensional parameters associated with graphic panel are evaluated:

If each panel is bigger than the no overlap minimum size then the graphics can be applied according to the simple rules.

If a panel is within the allowable overlap criteria (no overlap in one direction) and the overlap rules are obeyed then the graphics are applied.

If art objects need to be resized or repositioned then the system must provide feedback to the constraints manager 9 and get approval from a user if necessary before proceeding.

If no solution can be found then the problem manager is informed and the user is asked to alter the problem specification.

The art module will associate zero or more art templates with a style. An art template contains algorithms and logic associating and positioning art on a package style. This will provide at any point of the art creation process, for a nominated style, hard and soft constraints on product attributes such as dimension, eg length, width and depth.

During the solution generation process a comparison between values associated with a solution and the artwork constraints will result in the following possible outcome categories and responses:

One or more hard constraints are violated.
A potential solution cannot violate any hard constraints. The solution under consideration is discarded.

All soft constraints are met.
The template gives full support to the solution under consideration.

Some of the attributes the fall between hard and soft constraints, none violating hard constraints.
The nature and degree of the violation will be used to determine whether the results of the template are suitable for subsequent manual adjustment of the art objects and hence whether the solution is to be supported. The user can view the nature and degree of the violation of the constraint against consideration of other advantages of the solution.

As the state of the art module does not have to be complete before potential solutions are investigated there are a number of scenarios within which the state of the art module will determine the manner and extent of the interaction with the optimization process.

If for example the template has been defined, eg imported from a previous project but still may require alteration to suit the product currently being packaged, then style selection may be restricted to those associated with the template and the hard and soft constraints are adopted and activated within the optimization process. If an art template does not exist at the point of optimisation then, for a potential solution, the Solution Manager can provide solution variable values, eg dimensions plus style, for the determination of suitable templates.

The outcome of this comparison may be that zero or more templates are compatible. If there are no compatible templates then the solution will be tagged to this effect with the consequence that the art module is restricted to the supply of a die-line with additional support information, for manual placement of artwork. If at least one or more templates are compatible then the Solution Manager will provide one of two system options:

Determine the most suitable and attach to the solution.

Attach more than one template to the solution for consideration and selection by the user.

Figure 22:
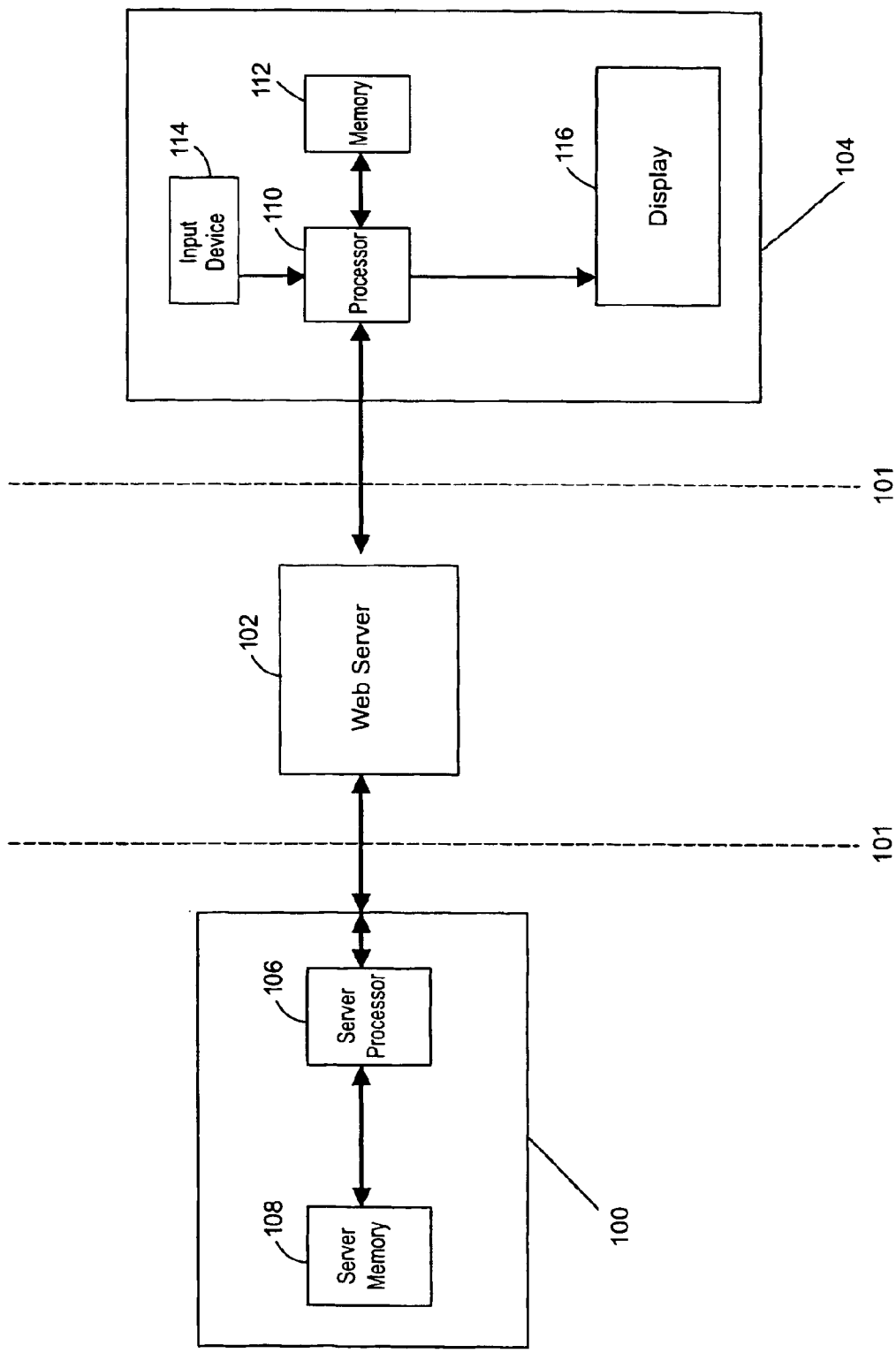
FIG. 22 is a schematic diagram showing one possible architechture for hosting the software system.

In a preferred embodiment, a typical internet architecture acts as a host for the software system, as illustrated in FIG. 22. A user uses a user computer 104 to access the system by the Internet. Typically, the individual software modules are executed by an application server 100 having a server processor 106 and server memory 108. Access is channelled and controlled by firewalls 101 with a web server 102 in the de-militarised zone between the fireballs. The system uses a standard web browser hosted by user computer 104 which has a processor 110, a memory 112, output means in the form of a display 116 and an input device 114. Alternatively, a dedicated application may be provided. The system displays various input screens on the display 116 and the user is thus able to interact with the system using input device 114, which may be a keyboard, a mouse or a combination of known input devices.

Figure 23:
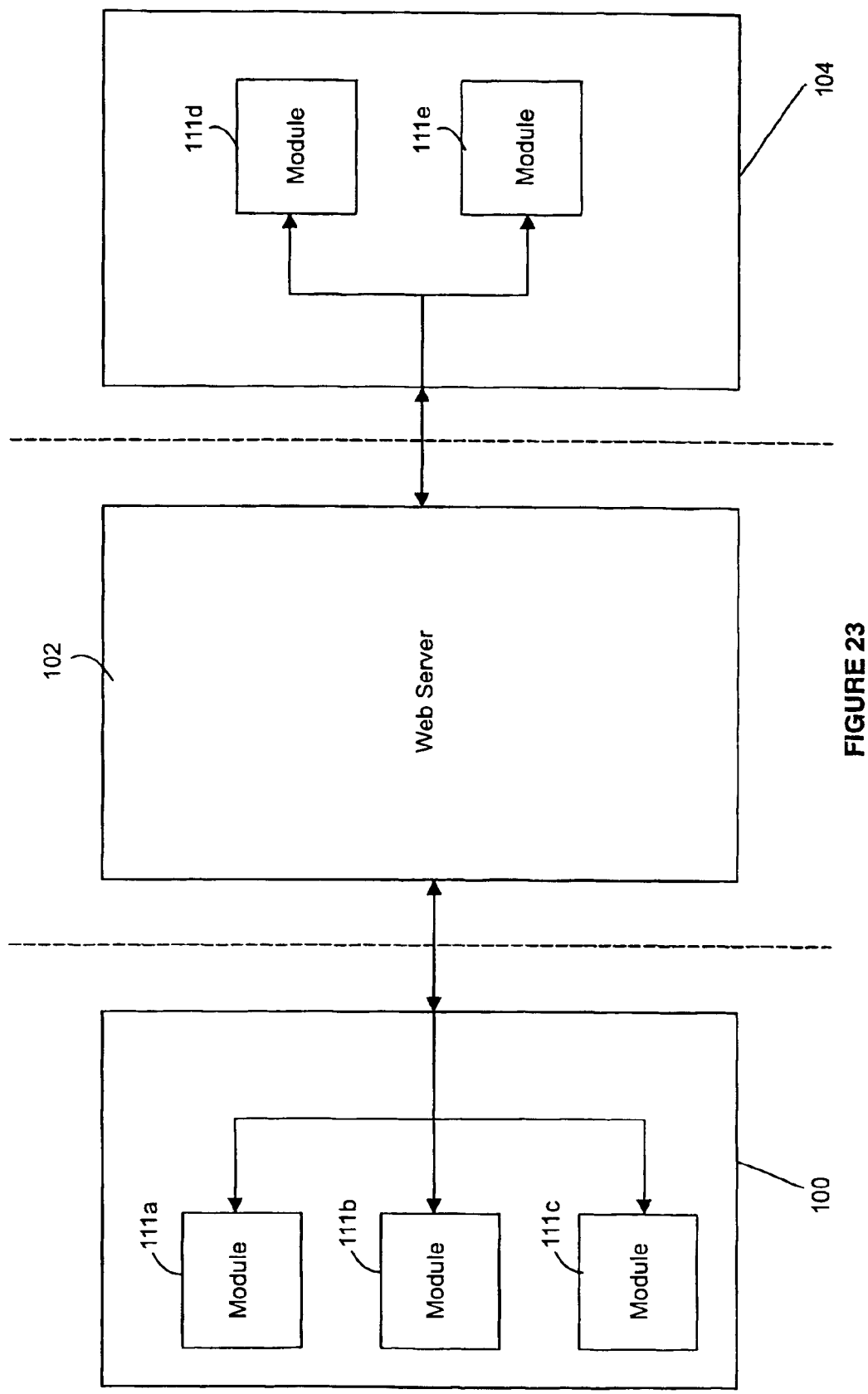
FIG. 23 is an illustrative one way in which software modules may be distributed.

Software modules 111 are hosted by application server 100 or may be distributed between the application server 100 and the user computer 104 as illustrated schematically in FIG. 23, where three modules 111a, 111b, 111c are located on the application server and two modules 111d, 111e are located on the user computer. In a further alternative, part of a module 111 may be hosted partly by the user computer and partly by the application server.

Thus, the user uses the input means to specify a predetermined parameter bearing a limit, in the predetermined parameter is stored in the memory means during specification of the product or process and the common means and feedback means are operative in response to the modules, and the display provides information to a user concerning the design of the product or process.

Some software modules may be distributed over a number of locations—for example, the size module. Such remote software modules may embody property parameters and/or operations specific to local requirements and means of communicating between modules may be carried out by using a services architecture.

It will be apparent to persons skilled in the art that a number of alternative configurations may be used without departing from the scope of the invention. For example, a module may be located on a further server local to the user.

The system employs an object management architecture such as CORBA™. An object request broker of the CORBA architecture lets objects transparently make requests to and receive responses from other objects located locally or remotely. In the preferred embodiment each of the modules are objects in this sense. The interface definition language (IDL), of architectures such as CORBA, provides operating system and programming language independent interfaces.

This is further facilitated in the present system by using a common nomenclature known as "Packscript™" to name all the variables which are used across the various modules so that when the modules share variables these can easily be identified.

Packscript™ or PaXML™: Naming Conventions

Packscript™ is a data naming convention for use in the packaging industry. These name structures identify data used in and across a growing number of packaging categories and computer software programs/formats or areas:

FDF/PDF field names for forms definitions,

Internet related "mark up" languages SGML, XML, HTML and VRML, column and table names in databases (Oracle, Access, xBase, Sybase, SQL etc).

Variable names in programming languages (C++, Visual Basic etc)and across a variety of packaging technologies:flexible plastics, rigid plastics, glass, carton boards, corrugated box, metal can, composite can, etc Because these data names are required to transcend the different and evolving computer softwares and also provide unification across the disparate packaging types, there is a need for a formalised structure to:

prevent duplication, provide compatibility across software platforms, provide a consistent and intuitive and common naming framework for the people who write software, for the people who use the software.

To this end, there are a number of general "software related" rules for naming variables:

Maximum identifier length should be within 30 characters. This is the upper limit for Microsoft SQL Server. Different softwares have different limits and a higher limit could have been chosen, but more than 30 characters would mean identifiers were too coupled.

Use only letters, numbers and the underscore character. No spaces, punctuation or extended characters should be used. These characters often have special meaning for different softwares.

This forces simplification on users with little loss in readability and avoid future problems.

First character must always be a letter. This is important for some software.

Use mixed case to delimit words where required. The underscore can also be used to separate words. eg FilmWidth or film_width.

Use the shortest possible name without using pointless or obscure abbreviations. For example, use "Item" rather than "Itm". The saving of 1 character is not worth the loss of readability.

Be consistent with the use of abbreviations. For example, "Num" might be selected instead of "num", "Number", "No", "count", "#" etc. Once decided, consistency is important.

A good "rule of thumb" for variable names is that you should be able to read them over the phone as a word without needing to spell them out.

Rules for PackScript™

A sorted list is available of all currently used packaging codes together with a full word description of that code (eg Pall for pallet, Attrib for attribute etc). An example of a list is set out in Appendix A of Australian provisional patent application PQ5212 from which the present application claims priority.

Each code begins with a capital letter and all following letters are to be lower case. These codes (and others that are added) will be concatenated in various ways to make a full description. Two ways of concatenating are used:

using an underscore character.

using mixed case delimiters.

A data name could look like this:

Code1_Code2_Code4Code5Code6_Code7.

Each data name is divided into 4 sections that will form a hierarchy (a tree structure). Each group is separated by an underscore. The groups are:

Packaging category (eg Box, Can, Flex, Ctn etc).

Sub category (eg Art, Spec, Dis, Del, Eng, etc).

Qualifier (eg Core, Shrink, Pilfer, Side, FilmWidth.

Item (eg Qty, Area, Num, Req, Seal, Ratio, Desc, Pct etc.

Group 1: Packaging Category.

This will define the packaging group or family. It is rare that a user will ever need to create a packaging category. Where possible, an existing category should be used. There should be no mixed case concatenation within this group. This is the trunk of the tree.

Group 2: Sub Category.

This will define a technology or organisational category within the packaging category. Where possible, an existing code should be used. A good rule of thumb to use when deciding on the need for a new category is "if you are going to use it in less than a dozen data names then you probably don't need it". There should be no mixed case concatenation within this group. These sub categories are the main branches of the tree.

Group 3: Qualifier.

This will allow for as much extra definition as is required to fully qualify the data name. It is possible (likely) that a single code will be insufficient and that two or more codes will need to be concatenated. If so, then mixed case delimiting should be used and the sequence of those codes should be alphabetical. It is probable that new codes may need to be created to complete the qualifier. If so, a new code and its full word description should be added to the list. These qualifiers complete the minor branches and the twigs of the tree.

Group 4: Item.

This is the "thing itself" that is being described. Typically it will be a noun and will complete the description. There should be no mixed case concatenation within this group. These items are the fruit or leaves of the tree.

Software will be made available to assist users in generating new codes and to check that the syntax rules are being obeyed.

Specific naming rules:

Qty Quantity eg an order quantity of 5,000 units—number of

Num Number as in a sequence eg Batch Number 5—next number (in a sequence).

Num should not be used for a code eg Die Number if the numbering is not in a sequence or if it contains alpha characters, Code is more appropriate.

L, W, D for Length Width Depth in the Item Group but Len, Wid, Dep is used in the Qualifier group to allow Upper case delimiting.

Size is used to represent a set of dimensions eg L×W×D whereas a single dimension would be Dim.

The # is used in the lists to indicate that a series of numbers would be used e.g. Ink#=Ink1, Ink2, Ink3 . . . Inkn.

Del—Delivery format of the package eg the 'flat size' for cartons, empty cans etc.

Dis—Distribution format ie External Size of finished (setup) pack.

Box_Dis_LayPalPer_Qty=Quantity Per Layer (Per relates to lowest level/smallest Qualifier, in this case the Layer not the Pallet).

Examples of the use of the Packscript™ naming convention are set out in Appendix B of Australian provisional patent application PQ5212 from which the present application claims priority. Alternatively, PackScript™ may be implemented in an XML format. An example of the PaXML™, XML schema, associated with a corrugated box, is given in Appendix A of the present application.

Various modifications of this system will be apparent to persons skilled in the art and are considered to be within the scope of the invention described herein.

APPENDIX A

```
PackScript ™ Implemented in an XML format (PaXML ©)
XML Data Type Definition (DTD) for a Subset of PackScript ™
<?xml version="1.0" encoding="ISO-8859-1"?>
<!DOCTYPE CorrugatedBox [
<!ELEMENT CorrugatedBox (Box*) >
<!ATTLIST CorrugatedBox
            Units (Metric | Imperial) "Metric" >
<!ELEMENT Box
(GenArt?,Size*,Style?,Weight?,BoxManuf*,CorrBrdGrd?,Blank*,CAD?,
            BoxPerf*)? >
<!ATTLIST Box
            FixedAttrCode CDATA #IMPLIED
            Designer CDATA #IMPLIED
            Note CDATA #IMPLIED
            Date CDATA #IMPLIED
            EnqCode CDATA #IMPLIED
            ContentsDescr CDATA #IMPLIED
            BoxCode CDATA #IMPLIED
            MaterCost CDATA #IMPLIED
            AreaAboveMin CDATA #IMPLIED
            MaxAreaAboveMin CDATA #IMPLIED
            CompCode CDATA #IMPLIED
            RouteCode CDATA #IMPLIED
            PrimQty CDATA #IMPLIED
            PoCode CDATA #IMPLIED
            Cost CDATA #IMPLIED
            PackagingCost CDATA #IMPLIED
            RefCode CDATA #IMPLIED >
<!ELEMENT GenArt
(Ink*,Print?,Artwork*,BarCode*,BoxStamp?,DateStamp?,PalletGraphic?,
            Logo?,Customer?) >
<!ATTLIST GenArt
            RefCode CDATA #IMPLIED
            StereoCode CDATA #IMPLIED
            POCodeReq (Yes | No) #IMPLIED
            Print (Yes | No) "yes"
            DueDate CDATA #IMPLIED
            Code CDATA #IMPLIED
            A4ScalePerc CDATA #IMPLIED
            StereoCharge CDATA #IMPLIED
            CustProdCode CDATA #IMPLIED >
<!ELEMENT Size
(Length*,Width*,Depth*,Volume*,Weight*,Flap*)? >
<!ATTLIST Size
            Descr CDATA #IMPLIED >
<!ELEMENT Style EMPTY >
<!ATTLIST Style
            JointCode CDATA #IMPLIED
            Code CDATA #IMPLIED
            Group CDATA #IMPLIED
            Descr CDATA #IMPLIED >
<!ELEMENT Weight EMPTY >
<!ATTLIST Weight
            Value CDATA #IMPLIED
            LimitQual (Max | Min | Gross | Nett | Tare)
```

APPENDIX A-continued

```
#IMPLIED
            WtLoadUnits (kg | Tonne | Ton | grm | lb | N
| kN | gsm) #IMPLIED >
<!ELEMENT BoxManuf (Corrug?,Die?) >
<!ATTLIST BoxManuf
            ManufClass CDATA #IMPLIED
            StockItem (Yes | No) "No"
            SiteCode CDATA #IMPLIED >
<!ELEMENT CorrBrdGrd EMPTY >
<!ATTLIST CorrBrdGrd
            Struct (SW | SF | TW | DW) "SW"
            Cost CDATA #IMPLIED
            CostType (Fixed | Variable | Nett | Gross |
Total | Unit | Full |
            Standard | Actual | Budget) #IMPLIED
            CostBasisPer (m2 | Tonne | hr | day | week |
yr | month | kg | unit)
            #IMPLIED
            Code CDATA #IMPLIED
            Descr CDATA #IMPLIED
            FluteDir (Horz | Vert) "Vert"
            FeedDir (MD | CD) "CD"
            FluteCode CDATA #IMPLIED >
<!ELEMENT Blank (Length*,Width*)? >
<!ATTLIST Blank
            Dim CDATA #IMPLIED
            Dir (MD | CD | X | Y) "CD"
            Area CDATA #IMPLIED
            RuleLen CDATA #IMPLIED
            MaxMin (Max | Min) #IMPLIED >
<!ELEMENT CAD EMPTY >
<!CAD
            FileType CDATA #IMPLIED
            URI CDATA #IMPLIED >
<!ELEMENT BoxPerf (DanGoodsReq?) >
<!ATTLIST BoxPerf
            BSF CDATA #IMPLIED
            GSF CDATA #IMPLIED
            BCT CDATA #IMPLIED
            SolnNum CDATA #IMPLIED
            WDFace CDATA #IMPLIED
            LDFace CDATA #IMPLIED >
<!ELEMENT Ink (InkBrand?,InkProp?,Colour?) >
<!ATTLIST Ink
            Num CDATA #IMPLIED
            Perc CDATA #IMPLIED
            Type CDATA #IMPLIED >
<!ELEMENT Print EMPTY >
<!ATTLIST Print
            Code CDATA #IMPLIED
            OverScore (Yes | No) "No"
            Dir (MD | CD | X | Y) "CD"
            Preprint (yes | no) "no"
            Process CDATA #IMPLIED >
<!ELEMENT Artwork EMPTY >
<!ATTLIST Artwork
            URI CDATA #IMPLIED
            FileName CDATA #REQUIRED
            FileTypeA (gif | tif | bmp |ai) "gif" >
            <!ELEMENT BarCode EMPTY >
            <!ATTLIST BarCode
            BarCodeType (TUN | EAN | 128) #IMPLIED
            URI CDATA #IMPLIED
            Num CDATA #IMPLIED
            FileTypeA (gif | tif | bmp | ai) "gif" >
<!ELEMENT BoxStamp EMPTY >
<!ATTLIST BoxStamp
            Req (Yes | No) #IMPLIED
            FileType CDATA #IMPLIED
            URI CDATA #IMPLIED >
            <!ELEMENT DateStamp EMPTY >
            <!ATTLIST DateStamp
            FileType CDATA #IMPLIED
            URI CDATA #IMPLIED
            Value CDATA #IMPLIED >
<!ELEMENT PalletGraphic EMPTY >
<!ATTLIST PalletGraphic
            PalletSys (Distribution | Delivery)
"Distribution"
```

APPENDIX A-continued

```
            FileType CDATA #IMPLIED
            URI CDATA #IMPLIED >
<!ELEMENT Logo (Brand?,Corp*) >
<!ATTLIST Logo
            URI CDATA #IMPLIED
            FileType CDATA #IMPLIED
            LogoType (Brand | Co | Caption) #IMPLIED
>
<!ELEMENT Customer EMPTY >
<!ATTLIST Customer
            Contact CDATA #IMPLIED
            Address CDATA #IMPLIED
            LogoType (Brand | Co | Caption) #IMPLIED >
<!ELEMENT Length EMPTY >
<!ATTLIST Length
            IntExt (Int | Ext) #IMPLIED
            Value CDATA #IMPLIED
            MaxMin (Max | Min) #IMPLIED >
<!ELEMENT Width EMPTY >
<!ATTLIST Width
            Value CDATA #IMPLIED
            IntExt (Int | Ext) #IMPLIED
            MaxMin (Max | Min) #IMPLIED >
<!ELEMENT Depth EMPTY >
<!ATTLIST Depth
            IntExt (Int | Ext) #IMPLIED
            Value CDATA #IMPLIED
            MaxMin (Max | Min) #IMPLIED >
<!ELEMENT Volume EMPTY >
<!ATTLIST Volume
            Value CDATA #IMPLIED
            IntExt (Int | Ext) #IMPLIED
            LimitQual (Max | Min | Gross | Nett | Tare)
#IMPLIED >
<!ELEMENT Flap EMPTY >
<!ATTLIST Flap
            TopBot (Top | Bot) #IMPLIED
            GapType (Gap | Overlap) "Gap"
            Value CDATA #IMPLIED
            MaxMin (Max | Min) #IMPLIED >
<!ELEMENT Corrug EMPTY >
<!ATTLIST Corrug
            Trim CDATA #IMPLIED
            NumOut CDATA #IMPLIED
            Dim CDATA #IMPLIED
            Dir (MD | CD | X | Y) "CD"
            TrimPerc CDATA #IMPLIED
            SelfDeckNumOut CDATA #IMPLIED
<!ELEMENT Die EMPTY >
<!ATTLIST Die
            Cost CDATA #IMPLIED
            NumOut CDATA #IMPLIED
            Dir (MD | CD | X | Y) "CD"
            PlySize CDATA #IMPLIED
            TotRule CDATA #IMPLIED
            Code CDATA #IMPLIED
            Full (Yes | No) #IMPLIED
            DieCutterCode CDATA #IMPLIED
            BalanceRule CDATA #IMPLIED
            Knife CDATA #IMPLIED
            StripRule CDATA #IMPLIED >
<!ELEMENT DanGoodsReq EMPTY >
<!ATTLIST DanGoodsReq
            DangGoods (Yes | No) "No"
            UNCode CDATA #IMPLIED
            ApprovalNo CDATA #IMPLIED
            Code CDATA #IMPLIED >
<!ELEMENT InkBrand (#PCDATA) >
<!ATTLIST InkBrand
            Code CDATA #REQUIRED
            Name CDATA #REQUIRED >
<!ELEMENT InkProp (#PCDATA) >
<!ELEMENT Colour EMPTY >
<ATTLIST Colour
            Name CDATA #IMPLIED
            Code CDATA #IMPLIED
            Qty CDATA #IMPLIED
            Reg (Yes | No) "No"
            Num CDATA #IMPLIED >
```

APPENDIX A-continued

```
<!ELEMENT Brand (Variety+,Promotion+) >
<!ELEMENT Corp EMPTY >
<!ATTLIST Corp
            FileName CDATA #REQUIRED
            FileType (gif | tif | bmp | ai) "gif"
            FileURI CDATA #IMPLIED >
<!ELEMENT Variety EMPTY >
<!ATTLIST Variety
            FileName CDATA #REQUIRED
            FileType (gif | tif | bmp | ai) "gif"
            FileURI CDATA #IMPLIED >
<!ELEMENT Promotion EMPTY >
<!ATTLIST Promotion
            FileName CDATA #REQUIRED
            FileType (gif | tif | bmp | ai) "gif"
            FileURI CDATA #IMPLIED >
```

The claims defining the invention are as follows:

1. A software system embodied on a computer system for specifying design of at least two links in a packaging chain for a product, the software system comprising:

a first software module for specifying design of a first link in the packaging chain according to a first set of design criteria, a second software module independent of the function of the first software module for specifying design of a second link in the packaging chain according to a second set of design criteria, the first set of design criteria and said second set of design criteria being different from one another, the first and second software modules having a first module parameter and a second module parameter respectively, each of the first and second module parameters having a limit which should not normally be breached, conversion means interconnecting the first software module and the second software module to enable data representing the design of the first or second link in the packaging chain to be recognized in the other of the software modules, and feedback means to provide feedback when the design specified for the first link by the first software module will breach the limit of the second module parameter or when the design specified for the second link by the second software module will breach the limit of the first module parameter.

2. A software system as claimed in claim 1, wherein the feedback is provided to a controller which acts to resolve breaching.

3. A software system as claimed in claim 2, wherein the controller resolves breaching by restricting at least the design specified by the software module causing or likely to cause breaching.

4. A software system as claimed in claim 2, wherein the controller will allow the design specified by the software module which may have caused breaching to continue by permitting adjustment of the first module parameter or the second module parameter past the respective limit with a user's knowledge.

5. A software system as claimed in claim 1, wherein the feedback is provided to the software module causing breaching and the software module causing breaching restricts its design to avoid further breaching.

6. A software system as claimed in claim 1, wherein each software module has a plurality of predetermined parameters, each predetermined parameter having a limit which should not normally be breached and the feedback means provides feedback if there is or is likely to be a breach of any one of the limits.

7. A software system as claimed in claim 6, wherein the feedback is provided to a controller which acts to resolve breaching.

8. A software system as claimed in claim 7, wherein the controller resolves breaching by restricting at least the design specified by the software module causing or likely to cause breaching.

9. A software system as claimed in claim 6, wherein the feedback is provided to the software module causing breaching and the software module causing breaching restricts its design to avoid further breaching.

10. A software system as claimed in claim 1, wherein the limits of the first module parameter and the second module parameter comprise bounds of allowable sets of values of the first module parameter and the second module parameter respectively and the software system permits automatic adjustment of the first module parameter and the second module parameter within the allowable sets of values.

11. A software system as claimed in claim 1, wherein the software system permits a user to adjust the limit of one or both of the first and second module parameters.

12. A software system as claimed in claim 1, wherein the software system permits a user to set the limit of one or both of the first and second module parameters.

13. A software system as claimed in claim 1, further comprising at least a third software module for specifying design of at least a third link in the packaging chain and having a third module parameter having a limit which should not normally be breached, wherein the feedback means provides feedback if the design specified for a link by any of the software modules will breach the limit of any of the module parameters.

14. A software system as claimed in claim 1, wherein the packaging chain for a product involves the production of the product, its packaging and its placement on a retail shelf.

15. A software system as claimed in claim 14, wherein each software module respectively relates to one of:
   a. a product
   b. a wrapper
   c. a primary pack
   d. an intermediate pack
   e. a carton
   f. a box
   g. a container load
   h. a pallet load
   i. a retail shelf stocking arrangement
   j. a packaging system; or
   k. a manufacturing process.

16. A software system as claimed in claim 1, wherein the first and second software modules are executed by a host having a processor means, memory means, input means and output means, and wherein during use a user uses the input means to specify one or both of the first and second module parameters, the specified module parameters being stored in the memory means during design specification of the links in the packaging chain, and wherein the conversion means and the feedback means are operative in response to operation of the processor means and the first and second software modules, and wherein the output means provides information to a user concerning the design of the packaging chain.

17. A software system as claimed in claim 16, wherein the host is a single computer.

18. A software system as claimed in claim 16, wherein the host includes an application server and a user computer, wherein the user computer has the output means and the input means, and wherein the memory means includes memory devices belonging to each of the application server and the user computer and the processor means includes processor devices belonging to each of the application server and the user computer.

19. A software system as claimed in claim 18, wherein both of the first and second software modules are executed by the application server.

20. A software system as claimed in claim 18, wherein one of the first and second software modules is executed by the application server and the other of the first and second software modules is executed by the user computer.

21. A software system as claimed in claim 18, wherein one of the first and second software modules is executed partly by the application server and partly by the user computer.

22. A software system as claimed in claim 1, wherein the system permits automatic adjustment of the limit of one of the first and second module parameters provided a predetermined condition is met.

23. A software system embodied on a computer system for specifying design of a packaging chain comprising at least two interrelated aspects, the software system comprising:
   a first software module for specifying design of a first aspect of the packaging chain by means of a first set of parameters, wherein one or more parameters of the first set of parameters is a constrained parameter which may only take predetermined allowable values; and
   a second software module for specifying design of a second aspect of the packaging chain by means of a second set of parameters, wherein one or more parameters of the second set of parameters is a constrained parameter which may only take predetermined allowable values,
   the first and second software modules being connected such that the design specified for the second aspect of the packaging chain by means of the second set of parameters is automatically constrained to values of the second set of parameters which relate to allowable values of the constrained parameters of the first set of parameters, and the design specified for the first aspect of the packaging chain by means of the first set of parameters is automatically constrained to values of the first set of parameters which relate to allowable values of the constrained parameters of the second set of parameters.

24. A software system as claimed in claim 23, wherein a plurality of the parameters of the first set of parameters are constrained parameters which may only take predetermined values, and the design specified for the second aspect is automatically constrained to values of the second set of parameters which relate to allowable values of the constrained parameters of the first set of parameters.

25. A software system as claimed in claim 23, wherein a plurality of the parameters of the second set of parameters are constrained parameters which may only take predetermined values, and the design specified for the first aspect is automatically constrained to values of the first set of parameters which relate to allowable values of the constrained parameters of the second set of parameters.

26. A software system as claimed in claim 23, wherein the design specified for the second aspect of the packaging chain is automatically constrained by feedback from the first software module.

27. A software system as claimed in claim 26, wherein the feedback is provided to a controller which controls the design specified for the second aspect of the packaging chain.

28. A software system as claimed in claim 26, wherein the feedback is provided to the second software module which controls the design specified for the second aspect of the packaging chain.

29. A software system as claimed in claim 23, wherein the design specified for the first aspect of the packaging chain is automatically constrained by feedback from the second software module.

30. A software system as claimed in claim 23, wherein the software system is for specifying a packaging chain having a plurality of aspects each aspect being related to at least one of the other aspects, specification of each of the aspects being automatically constrained to values of the parameters which specify the aspect which relates to allowable values of any constrained parameters of the parameters of the other aspects of the packaging chain.

31. A software system as claimed in claim 23, wherein the packaging chain involves the production of a product, packaging of the product and placement of the product on a retail shelf.

32. A software system as claimed in claim 23, wherein each software module respectively corresponds to one of: a product, a wrapper, a primary pack, an intermediate pack, a carton, a box, a pallet load, a container load, a retail shelf stocking arrangement, a packaging system, or a manufacturing process.

33. A software system as claimed in claim 23, further having data passing means for passing data between the first and second software modules.

34. A software system as claimed in claim 23, wherein the first and second software modules use different data formats and the software system includes data format conversion means for converting data of each of the first and second software modules as necessary so that it can be understood by the other software module.

35. A software system as claimed in claim 34, wherein the data format conversion means converts data as necessary into a standardized data format understood by both of the first and second software modules.

36. A software system as claimed in claim 34, wherein at least one of the first and second software modules uses a standardized data format.

37. A software system as claimed in claim 23, wherein the first and second software modules are executed by a host having processor means, memory means, input means and output means, and wherein in use a user uses the input means to specify one or more of the a constrained parameters which may only take predetermined values, the constrained parameters being stored in the memory means during specification of the packaging chain design, the processor means being operative such that specification of the packaging chain is automatically constrained, and wherein the output means provides information to a user concerning the packaging chain design.

38. A software system as claimed in claim 37, wherein the host is a single computer.

39. A software system as claimed in claim 37, wherein the host includes an application server and a user computer, wherein the user computer has the output means and the input means, and wherein the memory means includes memory devices belonging to each of the application server and the user computer and the processor means includes processor devices belonging to each of the application server and the user computer.

40. A software system as claimed in claim 39, wherein both of the first and second software modules are executed by the application server.

41. A software system as claimed in claim 39, wherein one of the first and second software modules is executed by the application server and the other of the first and second software modules is executed by the user computer.

42. A software system as claimed in claim 39, wherein one of the first and second software modules is executed partly by the application server and partly by the user computer.

43. A system for selecting a packaging style relating to a structure of a package, the system including:
- a database for storing a plurality of packaging styles relating to the structure of the package, each packaging style having a set of attributes;
- style specification means for allowing a user to specify desired attributes;
- comparison means for comparing the desired attributes with the sets of attributes of the packaging styles stored in the database in order to determine a packaging style having a set of attributes related to the desired attributes; and
- display means for displaying the determined packaging style to the user;
- wherein the comparison means produces a measure of how closely related the set of attributes of a packaging style is to the desired attributes and the display means displays the measure to help the user to determine whether the determined packaging style should be selected.

44. A system for selecting a packaging style as claimed in claim 43, wherein the comparison means determines a plurality of packaging styles having a set of attributes related to the desired attributes, and the display means displays the plurality of determined packaging styles, whereafter the user or system can select a packaging style from the plurality of packaging styles.

45. A system as claimed in claim 43, wherein the style specification means allows the user to specify attributes of a known packaging style as the desired attributes.

46. A system for selecting a packaging style, the system including:
- a database for storing a plurality of packaging styles, each packaging style having a set of attributes;
- style specification means for allowing a user to specify desired attributes of one of the packaging styles;
- comparison means for comparing the desired attributes with the sets of attributes of the packaging styles stored in the database in order to determine a packaging style having a set of attributes related to the desired attributes; and
- display means for displaying the determined packaging style to the user,
- wherein the style specification means allows the user to specify a desirability of individual ones of the desired attributes by assigning individual desired attributes a weighting and the comparison means determines a packaging style on the basis of the desirability of individual ones of the desired attributes and the weighting.

47. A method for selecting a packaging style relating to a structure of a package including:
- storing a plurality of packaging styles relating to the structure of a package in a database, each packaging style having a set of attributes;

permitting a user to specifying desired attributes;

comparing the desired attributes with the sets of attributes of the packaging styles stored in the database in order to determine a packaging style having a set of attributes related to the desired attributes; and displaying the determined packaging style to the user;

wherein the comparing produces a measure of how closely related the set of attributes of a packaging style is to the desired attributes and the measure is displayed to help the user to determine whether the determined packaging style should be selected.

48. A software system for designing a packaging chain including two or more different stages for a product, the software system comprising:

a plurality of software modules, each software module being used for specifying a design of one of the stages in the packaging chain using design criteria that is different than the design criteria used by the other software modules, each software module including one or more module parameters each having at least one limit which should not normally be breached; and a controller, wherein the software modules are interconnected so that the module parameters of each software module are available to the other software modules, and wherein each of the software modules is connected to provide feedback to the controller if the design specified by that software module will breach the limit of at least one of the module parameters of one of the other software modules.

49. The software system as claimed in claim 48, wherein the one or more module parameters include parameters having an upper and lower limit which should not normally be breached.

50. The software system as claimed in claim 48, wherein the one or more module parameters of at least one software module are automatically adjustable by the software system.

51. The software system as claimed in claim 48, wherein the one or more module parameters of at least one software module are user adjustable via an input device.

52. The software system as claimed in claim 48, wherein the design specified by a software module that will breach the limit of at least one of the module parameters of one of the other software modules is automatically constrained to design criteria that provide allowable values of the module parameters of the one of the other software modules.

53. The software system as claimed in claim 48, wherein the one or more module parameters of at least one software module are fuzzy parameters.

54. A software system embodied on one or more computer readable media for specifying design of at least two links in a packaging chain for a product, the software system comprising:

a first software module for specifying design of a first link in the packaging chain according to a first set of design criteria, a second software module independent of the function of the first software module for specifying design of a second link in the packaging chain according to a second set of design criteria, the first set of design criteria and said second set of design criteria being different from one another, the first and second software modules having a first module parameter and a second module parameter respectively, each of the first and second module parameters having a limit which should not normally be breached, conversion means interconnecting the first software module and the second software module to enable data representing the design of the first or second link in the packaging chain to be recognized in the other of the software modules, and feedback means to provide feedback when the design specified for the first link by the first software module will breach the limit of the second module parameter or when the design specified for the second link by the second software module will breach the limit of the first module parameter.

55. A software system embodied on one or more computer-readable media for specifying design of a packaging chain comprising at least two interrelated aspects, the software system comprising:

a first software module for specifying design of a first aspect of the packaging chain by means of a first set of parameters, wherein one or more parameters of the first set of parameters is a constrained parameter which may only take predetermined allowable values; and a second software module for specifying design of a second aspect of the packaging chain by means of a second set of parameters, wherein one or more parameters of the second set of parameters is a constrained parameter which may only take predetermined allowable values, the first and second software modules being connected such that the design specified for the second aspect of the packaging chain by means of the second set of parameters is automatically constrained to values of the second set of parameters which relate to allowable values of the constrained parameters of the first set of parameters, and the design specified for the first aspect of the packaging chain by means of the first set of parameters is automatically constrained to values of the first set of parameters which relate to allowable values of the constrained parameters of the second set of parameters.

* * * * *